United States Patent
Aubie et al.

(10) Patent No.: US 11,601,617 B2
(45) Date of Patent: Mar. 7, 2023

(54) METHOD FOR FORMING AN OUTPUT IMAGE SEQUENCE FROM AN INPUT IMAGE SEQUENCE, METHOD FOR RECONSTRUCTING AN INPUT IMAGE SEQUENCE FROM AN OUTPUT IMAGE SEQUENCE, ASSOCIATED DEVICES, SERVER EQUIPMENT, CLIENT EQUIPMENT AND COMPUTER PROGRAMS

(71) Applicant: FONDATION B-COM, Cesson-Sévigné (FR)

(72) Inventors: Jean-Yves Aubie, Melesse (FR); Wassim Hamidouche, Thorigné-Fouillard (FR); Patrick Dumenil, Betton (FR); Glenn Herrou, Cesson-Sévigné (FR)

(73) Assignee: FONDATION B-COM, Cesson Sevigne (FR)

( * ) Notice: Subject to any disclaimer, the term of this patent is extended or adjusted under 35 U.S.C. 154(b) by 442 days.

(21) Appl. No.: 16/961,735

(22) PCT Filed: Jul. 26, 2019

(86) PCT No.: PCT/EP2019/070290
§ 371 (c)(1),
(2) Date: Jul. 13, 2020

(87) PCT Pub. No.: WO2020/025510
PCT Pub. Date: Feb. 6, 2020

(65) Prior Publication Data
US 2021/0058582 A1   Feb. 25, 2021

(30) Foreign Application Priority Data
Jul. 30, 2018  (FR) ...................... 1857078

(51) Int. Cl.
*H04N 7/01*  (2006.01)

(52) U.S. Cl.
CPC ......... *H04N 7/0137* (2013.01); *H04N 7/0117* (2013.01); *H04N 7/0127* (2013.01)

(58) Field of Classification Search
CPC ...... H04N 7/01; H04N 7/0117; H04N 7/0127; H04N 7/0137
(Continued)

(56) References Cited

U.S. PATENT DOCUMENTS

2006/0165179 A1* 7/2006 Feuer .................. H04N 7/01
                                                      348/E7.003

FOREIGN PATENT DOCUMENTS

| EP | 3 041 233 A1 | 7/2016 |
| WO | 2017/129568 A1 | 8/2017 |

OTHER PUBLICATIONS

International Search Report and Written Opinion, dated Sep. 19, 2019, from corresponding/related International Application No. PCT/EP2019/070290.

(Continued)

Primary Examiner — Sherrie Hsia
(74) Attorney, Agent, or Firm — Nixon & Vanderhye

(57) ABSTRACT

A method for forming an image sequence that is an output sequence, from an input image sequence, is provided. The input image sequence has an input spatial resolution and an input temporal resolution. The output sequence has an output temporal resolution equal to the input temporal resolution and an output spatial resolution equal to a predetermined fraction 1/N of the input spatial resolution by an integer number N higher than or equal to 2. The method, implemented for a sub-sequence of the input frame sequence that is a current input sub-sequence and including a preset number of images, includes: obtaining a temporal frequency that is an image frequency, associated with the current input sub-sequence; processing the current input sub-sequence to (Continued)

Figure 1:
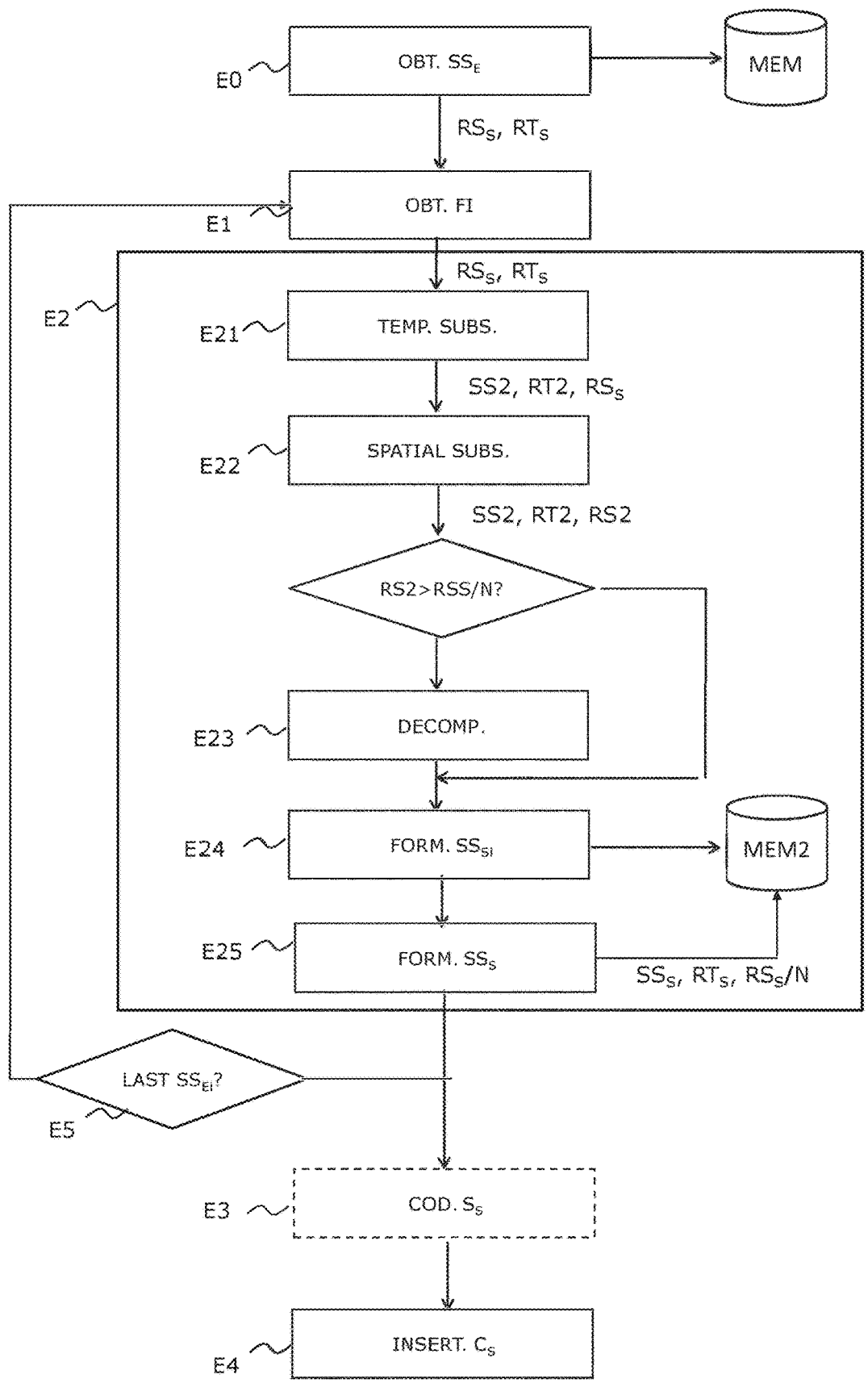

obtain an output sub-sequence; and inserting the output sub-sequence and the associated image frequency into an output container.

19 Claims, 14 Drawing Sheets

(58) Field of Classification Search
USPC .................................................. 348/441, 459
See application file for complete search history.

(56) References Cited

OTHER PUBLICATIONS

Sergios Theodoridis et al., "Introduction", Pattern Recognition, Nov. 26, 2008, pp. 1-12.
John W. Woods, "Digital Video Compression", Multidimensional Signal, Image, and Video Processing and Coding, Jan. 1, 2012, pp. 467-528.
Jiadi Yu et al., "Sensing Human-Screen Interaction for Energy-Efficient Frame Rate Adaptation on Smartphones", IEEE Transactions on Mobile Computing, Aug. 1, 2015, pp. 1698-1711.

* cited by examiner

METHOD FOR FORMING AN OUTPUT IMAGE SEQUENCE FROM AN INPUT IMAGE SEQUENCE, METHOD FOR RECONSTRUCTING AN INPUT IMAGE SEQUENCE FROM AN OUTPUT IMAGE SEQUENCE, ASSOCIATED DEVICES, SERVER EQUIPMENT, CLIENT EQUIPMENT AND COMPUTER PROGRAMS

1. FIELD OF THE INVENTION

The field of the invention is that of compression, transmission and storage of video contents, in particular adaptation to the available hardware resources.

The invention may in particular, but not exclusively, be applied to the processing of video contents that have a high spatial resolution on a limited-capacity network.

2. PRESENTATION OF THE PRIOR ART

Traditionally, the techniques used in broadcasting implement a variable bit rate compression, in particular in terrestrial or satellite network television. In this case, the format of the video is unique and the bit rate is adapted to the content to be encoded. This proven technique has for main drawback to be applicable only in a reduced bit rate range.

Another technique known under the name of ABR ("Adaptive Bit Rate") consists in storing in the network several streams encoded with different temporal and spatial resolutions. The stream is cut into segments. A client appliance chooses the suitable stream version as a function of its capacities and those of the network. It can choose another one in time, on the occasion of the delivery of a new segment, in order to follow at best the variations of capacity of the network. This solution is in particular well suited to a delivery of video content of the "streaming on IP" type using a transport protocol of the OTT ("Over the top") mode http type.

This technique has for drawback to be costly in terms of resources, due to the fact that it requires encoding, storing and transmitting several versions of a same content.

So-called scalable compression standards also exist, which produce for a same video content several complementary encoded data streams, comprising a base layer and one or several improvement layers. The client can decode the base layer alone to obtain a low-resolution or low-quality version of the video content or, if sufficient resources exist, decode one or several improvement layers, which are exploited by the decoder to produce increased resolution/quality decoded sequence.

These "scalable" techniques have often been ignored by the industrials that consider them as too complicated to implement (significant memory size, increased latency, etc.) for a limited benefit, because the network must, here too, be capable of transmitting all the layers composing the stream, letting to the receiver the choice to use only those which are considered useful or accessible.

Nowadays, the broadcasting of high spatial and temporal resolution video contents is generalized because it offers the clients a better visual quality and in particular a better perception of the details. Nevertheless, the appliances of the transmission chain do not yet all support these new video content formats, and even for those which support them, the transmission of these contents require very significant calculation, storage and bandwidth resources.

It is known from the patent application published under the number WO2017/129568 a method for encoding a frame sequence that performs a spatial decomposition of each of the frames into N sub-frames and forms a sequence with an N times higher temporal resolution using the obtained sub-frames. The sub-frame sequence is encoded using a standard encoder and additional signalling data are generated so that a decoder can reconstruct a decoded sequence at the spatial and temporal resolutions of the original sequence.

An advantage of this method is that it allows the use of an encoder of lower spatial resolution while rendering the video content with its original spatial resolution. It is further scalable, because it allows the decoder to reconstruct a frame sequence with a spatial resolution reduced by N, for example in HD format, from an input sequence in UHD format.

A drawback of this method is that it systematically multiplies the temporal resolution of the frames of the input sequence by a factor N, where N is an integer higher than or equal to 2.

It is also known from application EP3041233 a method for transmitting a high-quality video content while preserving the details of the image, even in case of strong movement. The input sequence is "hybrid" in the sense that it comprises sub-sequences described as representative of a static scene and sub-sequences described as representative of a moving scene. The described method pre-processes the input sequence as a function of the scene-type description information received. A sub-sequence corresponding to a static scene of the content is encoded with a high spatial resolution, for example UHD, and a low temporal resolution, for example 30 fps ("frame per second"), whereas a sub-sequence associated with a moving scene is encoded with an N times lower spatial resolution, for example HD, but with an N times higher temporal resolution, equal to 120 fps. Moreover, N frames of N times lower spatial resolution are encapsulated as "tiles" inside a single frame of N times higher spatial resolution. That way, the sequence to be encoded is in any case a high spatial resolution and low temporal resolution sequence, which allows less impacting the intermediate appliances of the transmission chain that must however support the required spatial resolution. On the decoder side, scene-type designation information, on a per sub-sequence basis, contained in the encoded data stream, allows it to determine which post-processing applying to the decoded frames to reconstruct an output sequence.

Taking into account the scene type allows guaranteeing a perceived quality level of the decoded sequence. Contrary to the above-described method, the encoder used systematically encodes frames at the maximum spatial resolution and at the minimum temporal resolution. On the other hand, the use of tiles and the fact to position the frames of the lower spatial resolution sequence inside a frame of higher spatial resolution constrain the inter-frame prediction and impact the compression efficiency. Moreover, the encoder and the decoder complexity is not reduced.

3. PRIOR ART DRAWBACKS

None of the prior art documents provides a solution for transmission and/or storage of a high spatial and temporal resolution video content that is both more resource-efficient and performing.

4. OBJECTS OF THE INVENTION

The invention helps in improving the situation.

The invention has notably for object to address these prior art drawbacks.

More precisely, an object of the invention is to propose a solution that allows limiting the resources required for the encoding, the storage or the transmission of a high spatial and temporal resolution video content, while preserving the compression efficiency and the quality perceived by the final user.

Another object of the invention is to propose an encoding solution that is in addition scalable.

5. DISCLOSURE OF THE INVENTION

These objects, as well as others that will appear hereinafter, are achieved by means of a method for forming a frame sequence, called output sequence, from an input frame sequence, said input frame sequence having an input spatial resolution and an input temporal resolution, said output sequence having an output temporal resolution equal to the input temporal resolution and an output spatial resolution equal to a predetermined fraction of the input spatial resolution by an integer number higher than or equal to 2, said method comprising the following steps, implemented for a sub-sequence of the input sequence, called current sub-sequence, and comprising a predetermined number of frames:
  obtaining a temporal frequency, called frame rate, associated with the current subsequence;
  processing the current input sub-sequence, comprising:
    temporally sub-sampling the current sub-sequence with a temporal sub-sampling rate comprised between 1 and the predetermined fraction, decreasing with the obtained frame rate, and forming a second sub-sequence having a second temporal resolution;
    spatially sub-sampling the formed second sub-sequence with a spatial sub-sampling rate comprised between 1 and the predetermined fraction, increasing with the frame rate, so that a product of the temporal and spatial sampling rates is equal to the predetermined fraction, and forming a third sub-sequence having a third spatial resolution;
    when the third spatial resolution is higher than the output spatial resolution, spatially decomposing the frames of the third sub-sequence into at least two sub-frames and at most N sub-frames of spatial resolution equal to the output spatial resolution, and forming the output frame sub-sequence by temporally inserting the sub-frames resulting from the decomposition between the decomposed frame and the following frame; and
  inserting the output sub-sequence and the associated frame rate into an output container.

The invention proposes a completely new and inventive approach of the processing of a high spatial resolution frame sequence, which consists in cutting the sequence into sub-sequences and in applying successively to each sub-sequence a temporal and spatial processing, which takes into account a frame rate associated with the sub-sequence and representative of the content thereof, so as to form a frame sub-sequence having a spatial resolution reduced by a predetermined fraction and an unchanged temporal resolution.

The obtained sequence is inserted into an output container that further comprises the frame rate information, so that a receiver appliance can make an inverse post-processing and retrieve the input frame sequence.

Contrary to the prior art, any subsequent processing of the obtained sub-frame sequence, whether it is a storage or an encoding or also a transmission on a transmission network, is made less complex due to its reduced spatial resolution.

By way of example, if the starting video is in UHD format, the storage and the encoding will be made on a HD format for the same number of frames, i.e. a reduction of the amount of information by a ratio 4.

According to an aspect of the invention, the method further comprises a step of encoding the formed sub-sequence and the associated frame rate information and in that the insertion step inserts the encoded data into the output container.

The output sequence having a conventional format, a standard encoding can be applied thereto to reduce the bit rate necessary for the representation of the video, which allows guaranteeing the compression efficiency.

According to still another aspect of the invention, the step of obtaining a frame rate associated with the current sub-sequence comprises the following sub-steps:
  extracting one feature vector per frame and forming one feature vector of the current sub-sequence from the N vectors;
  predicting a class of movement of the current sub-sequence using the formed vector and a supervised automatic prediction system;
  determining a frame rate associated with the predicted class of movement.

As a variant, the method can further comprise a preliminary step of determining the frame rate for at least said sub-sequence of the input sequence, said preliminary step comprising the following steps:
  extracting, for each frame of at least part of the frames of said sub-sequence, at least a first and a second feature sets;
  forming, for said sub-sequence, a first feature vector from at least a part of the first feature sets extracted for the considered frames and a second feature vector from at least a part of the second feature sets extracted for the considered frames;
  predicting a class of movement of the considered sub-sequence by means of at least a first and a second classification method, the first method being adapted to select or not, from the first feature vector, at least a first class of movement for said sub-sequence, the second method being adapted to select, if said first class of movement is not selected, at least a second or a third class of movement;
  obtaining the frame rate associated with the class of movement selected.

An advantage is that the prediction of a class of movement allows determining a frame rate associated with the sub-sequence that it adapted to the variation of its content. That way, the spatiotemporal pre-processing that is applied thereto preserves its essential features.

For a moving scene, the frame rate associated with the sub-sequence is high and the temporal resolution is preserved, so as to follow the movement. On the other hand, the spatial resolution is reduced, because the human eye will not perceive as well the details of the scene due to the movement. For a static scene, on the contrary, the frame rate associated with the sub-sequence is low and the input sub-sequence is temporally sub-sampled. On the other hand, the spatial resolution is preserved, so as to guarantee a quality rendering of the details of the scene.

Hence, the invention adapts the pre-processing applied to the sub-sequence in particular to the amount of movement present in the scene and to its texture variations.

According to still another aspect of the invention, the method further comprises a step of obtaining information representative of an interaction of a user with the formed sub-sequence and a step of deciding whether to modify the obtained frame rate as a function of said obtained information.

An advantage is that it is for example possible to force a high frame rate when the user interacts with the content. That way, it is guaranteed that the pre-processing applied to the current sub-sequence preserves the temporal resolution of the content. This embodiment relates to a use case of the invention involving a head-mounted display device in a context of virtual, increased or mixed reality. The head-mounted display device is connected to a server appliance that stores the input sequence and forms an output sequence on the fly, as a function of the interactions of the user with its virtual environment. Each time the user interacts with the scene, the latter is modified and the rendering of the scene he visualizes on his screen must be reconstructed. This aspect of the invention allows improving the reactivity of the rendering by taking into account the displacements of the users head. Indeed, increasing the frame rate contributes to reducing the latency between the movement and the moment when it is taken into account in the display of the head-mounted device. Forming method according to the preceding claim, characterized in that the obtaining step comprises obtaining users head movement detection information and the increasing step comprises positioning the frame rate associated with the current sub-sequence at a maximum value.

Indeed, when the user makes a head movement, he does no longer visualize the same part of the scene and the rendering displayed by the head-mounted display device must be updated in real time. Advantageously, the detection of this movement is taken into account by the method according to the invention in an inclusive "OR" logic. For example, in case of users head movement, the frame rate is simply positioned at its maximum value, independently of the nature of the displayed scene. That way, the formed sub-sequence will undergo no temporal sub-sampling to guarantee a good fluidity and a good quality of the scene rendering.

According to still another aspect of the invention, the predetermined fraction (1/N) is equal to ¼, the spatial and temporal sub-sampling steps comprise three distinct sub-sampling rate values and the frame rate determination step chooses one frame rate among three distinct rates.

An advantage is that there are 3 possible levels of spatial and temporal resolution, which are 1, ½ and ¼. This embodiment is particularly adapted to an input frame sequence of UHD spatial resolution, equal to 3840×2160 pixels, and of temporal resolution equal to 120 fps ("frames per second"). The output sequence is in HD format equal to 1920×1080 pixels, with a temporal resolution of 120 fps. The determined frame rate can be equal to 30, 60 or 120 fps.

According to a variant, a fraction equal to ⅛ can be chosen and 4 levels of spatial and temporal sub-sampling, which are 1, ½, ¼ and ⅛ can be used. This configuration is particularly adapted to an input frame sequence of spatial resolution 8K equal to 7680×4320 pixels and a temporal resolution equal to 240 fps. The output sequence is then also in a format equal to 1920×1080 pixels, with a temporal resolution of 240 fps.

Correlatively, the invention relates to a method for reconstructing a frame sequence, called input sequence, having an input spatial resolution and an input temporal resolution, from an output container, comprising an output sequence having an output spatial resolution equal to N times the input spatial resolution with an integer higher than or equal to 2 and an output temporal resolution equal to the input temporal resolution.

Said sequence being temporally cut into a plurality of sub-sequences, said method comprises the following steps, implemented for a sub-sequence of the output sequence, called current sub-sequence, and comprising a predetermined number of frames:
  obtaining the sub-sequence of the output sequence from the output container and obtaining information representative of a frame rate associated with said current sub-sequence;
  processing the current sub-sequence comprising:
    when the current sub-sequence has an associated frame rate that is lower than the output temporal resolution, spatially recomposing at least two successive frames of the sub-sequence into a frame of second spatial resolution higher than the input spatial resolution ($RS_E$) and lower than or equal to the output spatial resolution so as to form a second current frame sub-sequence of second temporal resolution equal to the frame rate;
    when the second spatial resolution is lower than the output spatial resolution, spatially over-sampling the frames of the second current sub-sequence with a spatial over-sampling rate comprised between 1 and the integer number, which increases with the frame rate, so as to obtain a third current sub-sequence of spatial resolution equal to the output spatial resolution; and
    when the second temporal resolution of the third current sub-sequence is lower than the input temporal resolution, reconstructing the input current sub-sequence by temporal recopy of at least one frame of the third sub-sequence between two successive frames of the sub-sequence so as to obtain a sub-sequence having the input temporal resolution.

On the decoder side, the frame rate information associated with a sub-sequence of the received output sequence allows a receiver to perform the inverse operations with respect to those of the pre-processing and to reconstruct the input frame sequence.

Another advantage of the invention is that it is naturally scalable without however implementing complex techniques such as those proposed in the SVC and SHVC standards.

The invention also relates to a method for partially reconstructing an input frame sequence having an input spatial resolution and an input temporal resolution, from an output container, comprising an output sequence having an output spatial resolution comprising an output sequence having an output spatial resolution equal to N times the input spatial resolution with an integer higher than or equal to 2 and an output temporal resolution equal to the input temporal resolution, characterized in that, said sequence being temporally cut into a plurality of sub-sequences, said method comprises the following steps, implemented per sub-sequence:
  obtaining, from the output container, a position of a sub-sequence of the output sequence, called current sub-sequence;
  processing the current sub-sequence comprising extracting a first frame from the sub-sequence; and
  forming a partial input sequence by inserting the first frame of the current sub-sequence.

The invention hence allows a client receiver appliance to process only the frames corresponding to the lowest spatial and temporal resolution, which corresponds to a minimum quality when the display resolution or the calculation capacity of the receiver do not allow processing the complete stream corresponding to the maximum quality.

It is moreover possible to use a better protection against the errors on the frames at the lowest spatial and temporal resolution in order to be able to ensure a minimum decoding quality in case of disturbance of the transmission channel.

According to another aspect of the invention, the container comprising encoded data, the method comprises a step of decoding encoded data of the output sequence.

Advantageously, the decoding comprises at least, for a sub-sequence, decoding the first frame.

The invention also relates to a device for forming an output sequence adapted to implement the forming method according to any one of the particular embodiments defined hereinabove. This device can of course comprise the different features related to the forming method according to the invention. Hence, the features and advantages of this device are the same as those of the forming method and will not be further detailed. According to a particular embodiment of the invention, such a device is comprised in a transmitter appliance, such as a server appliance or a terminal appliance.

The invention also relates to a reconstruction device adapted to implement the reconstruction method according to any one of the particular embodiments defined hereinabove. This reconstruction device can of course comprise the different features related to the encoding method according to the invention. Hence, the features and advantages of this encoding device are the same as those of the encoding method and will not be further detailed.

The invention also relates to a partial reconstruction device adapted to implement the partial reconstruction method according to the invention. This reconstruction device can of course comprise the different features related to the partial reconstruction method according to the invention. Hence, the features and advantages of this device are the same as those of the partial reconstruction method and will not be more fully detailed.

The invention also relates to a transmitter appliance, comprising a module for obtaining an input frame sequence, a device for forming an output frame sequence according to the invention, a module for storing an output container comprising the output sequence and a module for transmitting the output container through a communication network.

The invention also relates to a receiver appliance, comprising a module for receiving data through a communication network, adapted to receive an output container comprising an output frame sequence, and a device for reconstructing, partially or not, an input sequence from the output sequence according to any one of the embodiments of the invention.

The invention also relates to a computer program including instructions for implementing the steps of a method for forming an output sequence as described hereinabove, when this program is executed by a processor and a computer program including instructions for implementing the steps of method for reconstructing or partially reconstructing an input sequence, as described hereinabove, when this program is executed by a processor.

These programs can use any programming language. They can be downloaded from a communication network and/or recorded on a medium readable by a computer.

The invention finally relates to recording media, readable by a processor, integrated or not to the device for forming an output frame sequence and to the reconstruction devices according to the invention, potentially removable, memorizing respectively a computer program implementing a forming method and a computer program implementing a reconstruction method, as described hereinabove.

6. LIST OF FIGURES

Figure 2:
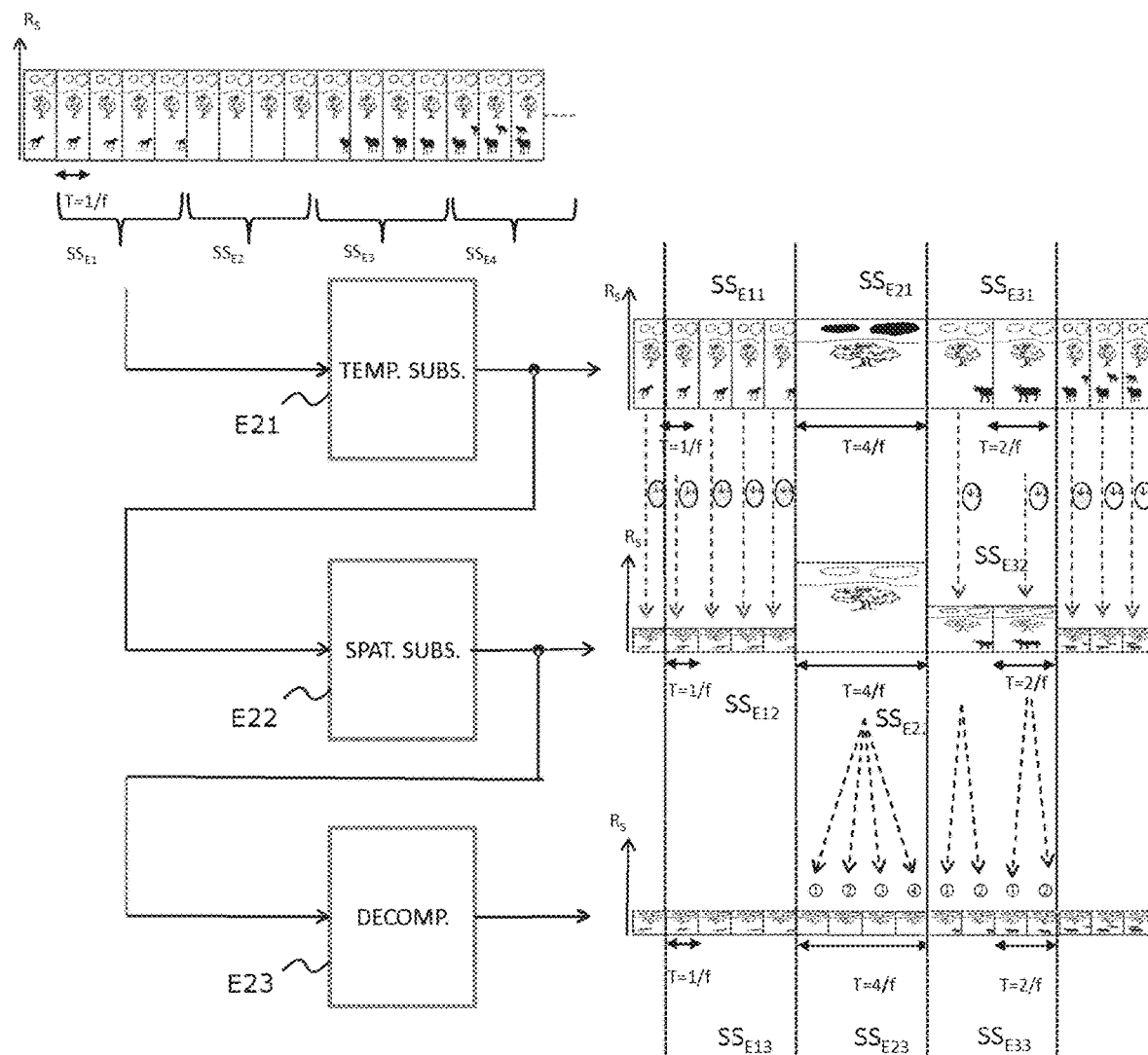
Figure 3:
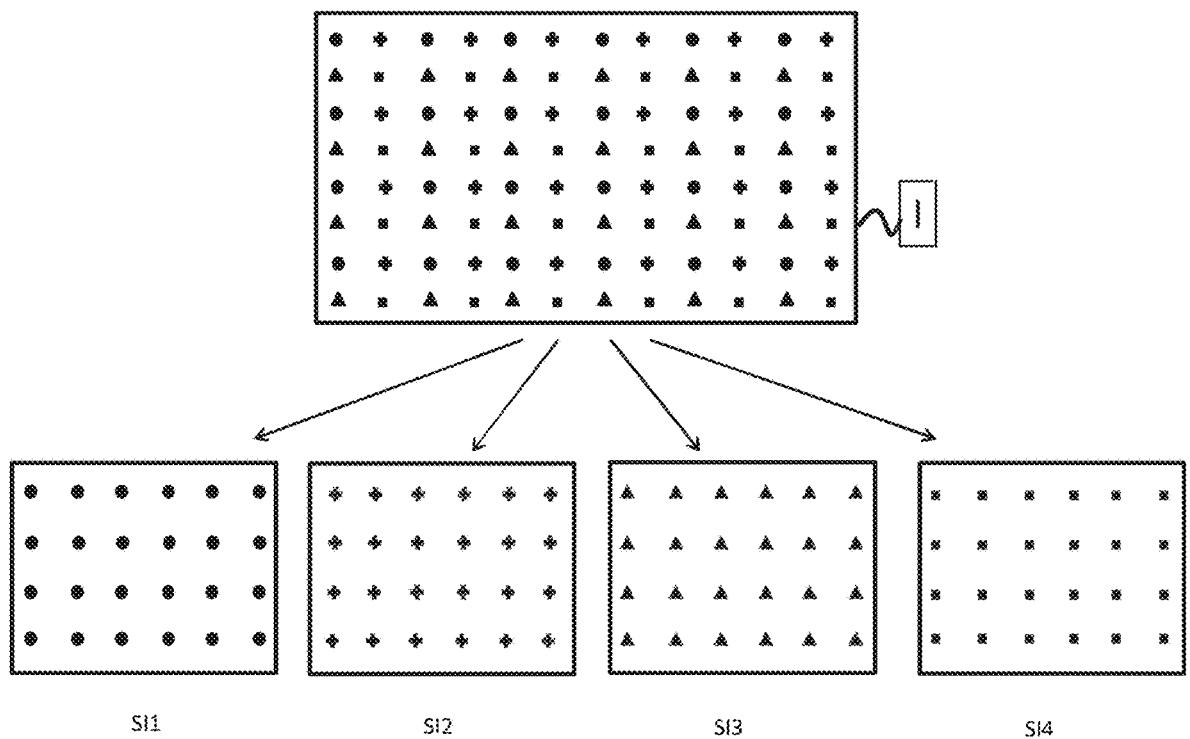
Figure 4:
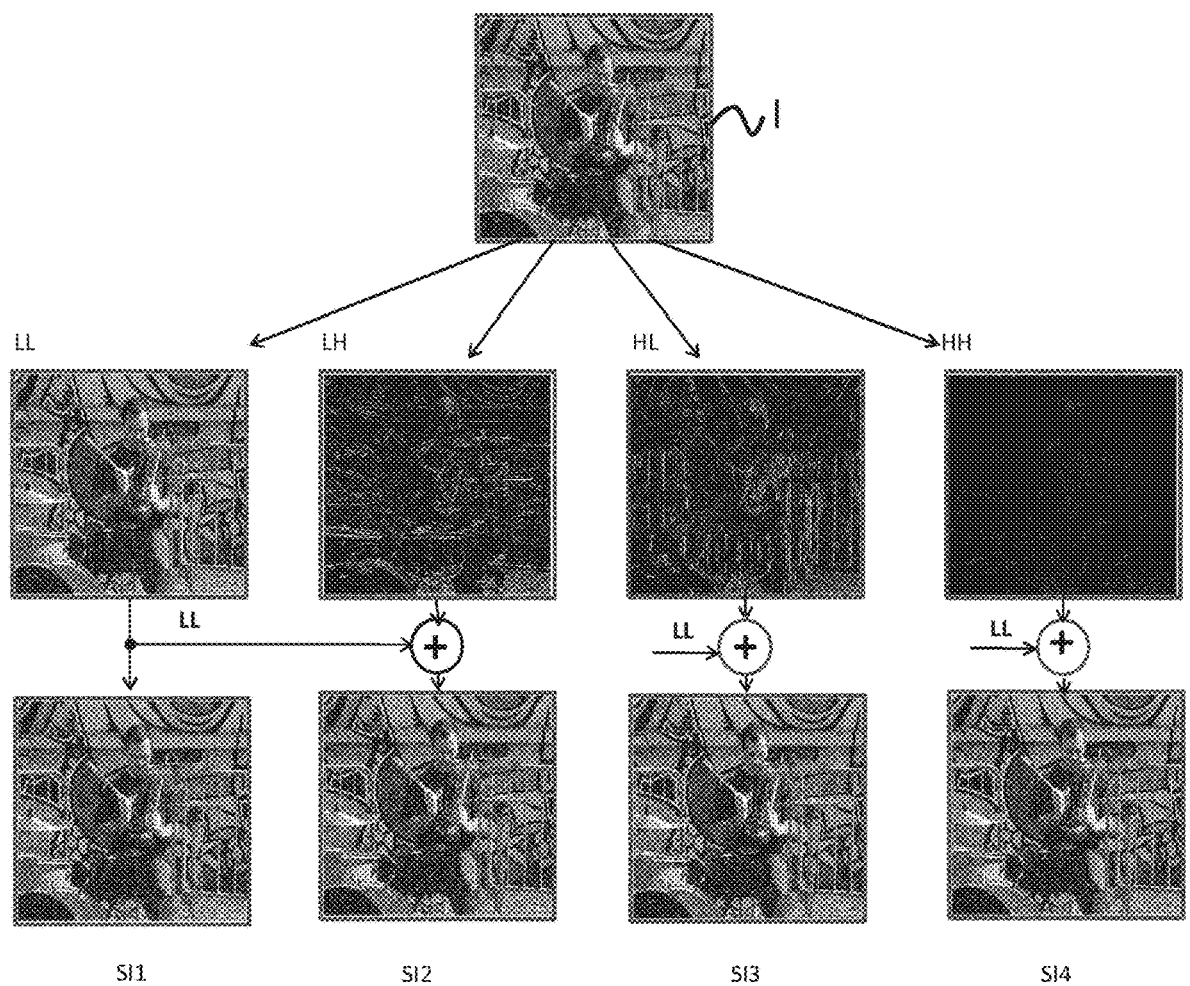
Figure 5:
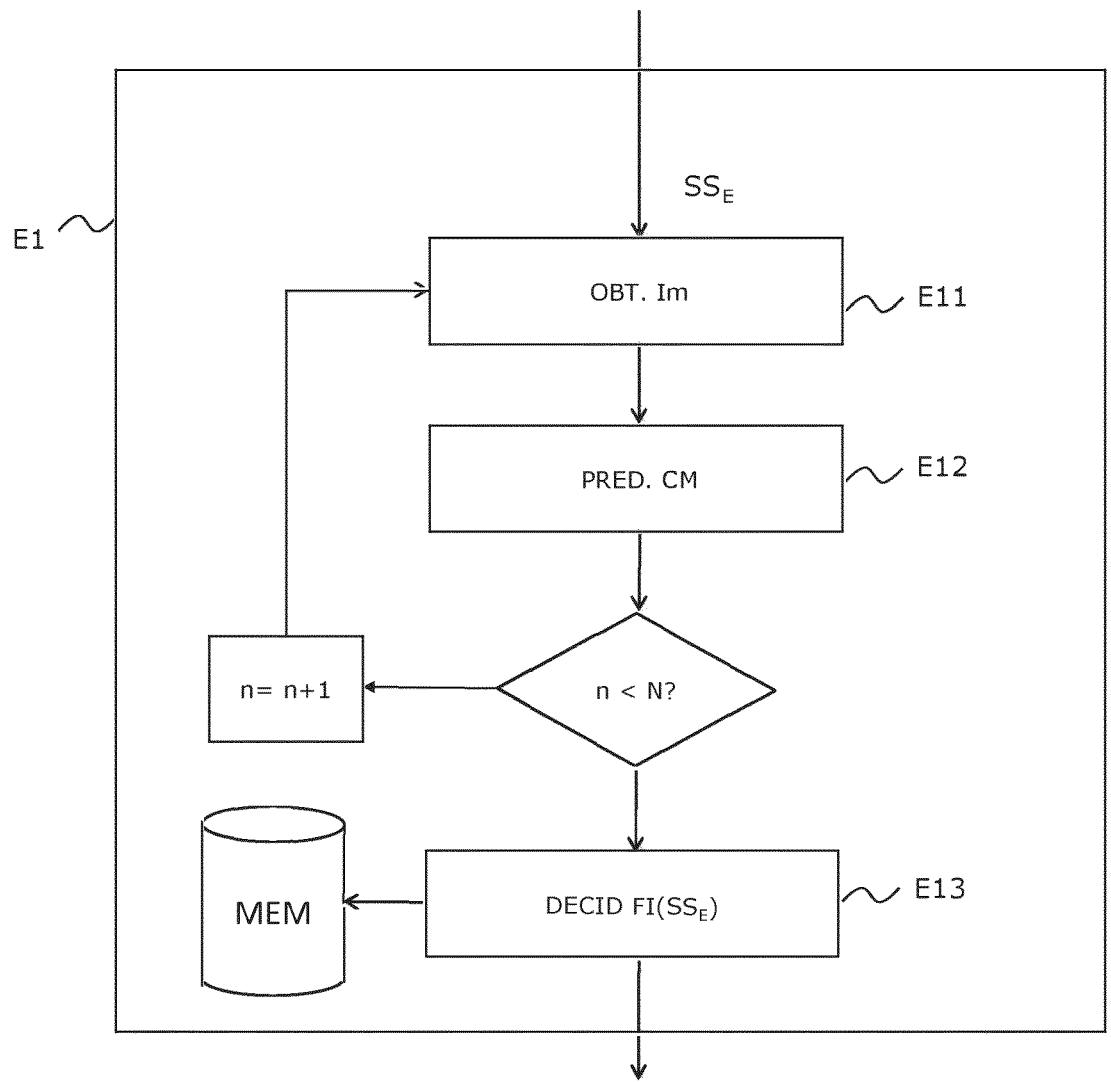
Figure 6:
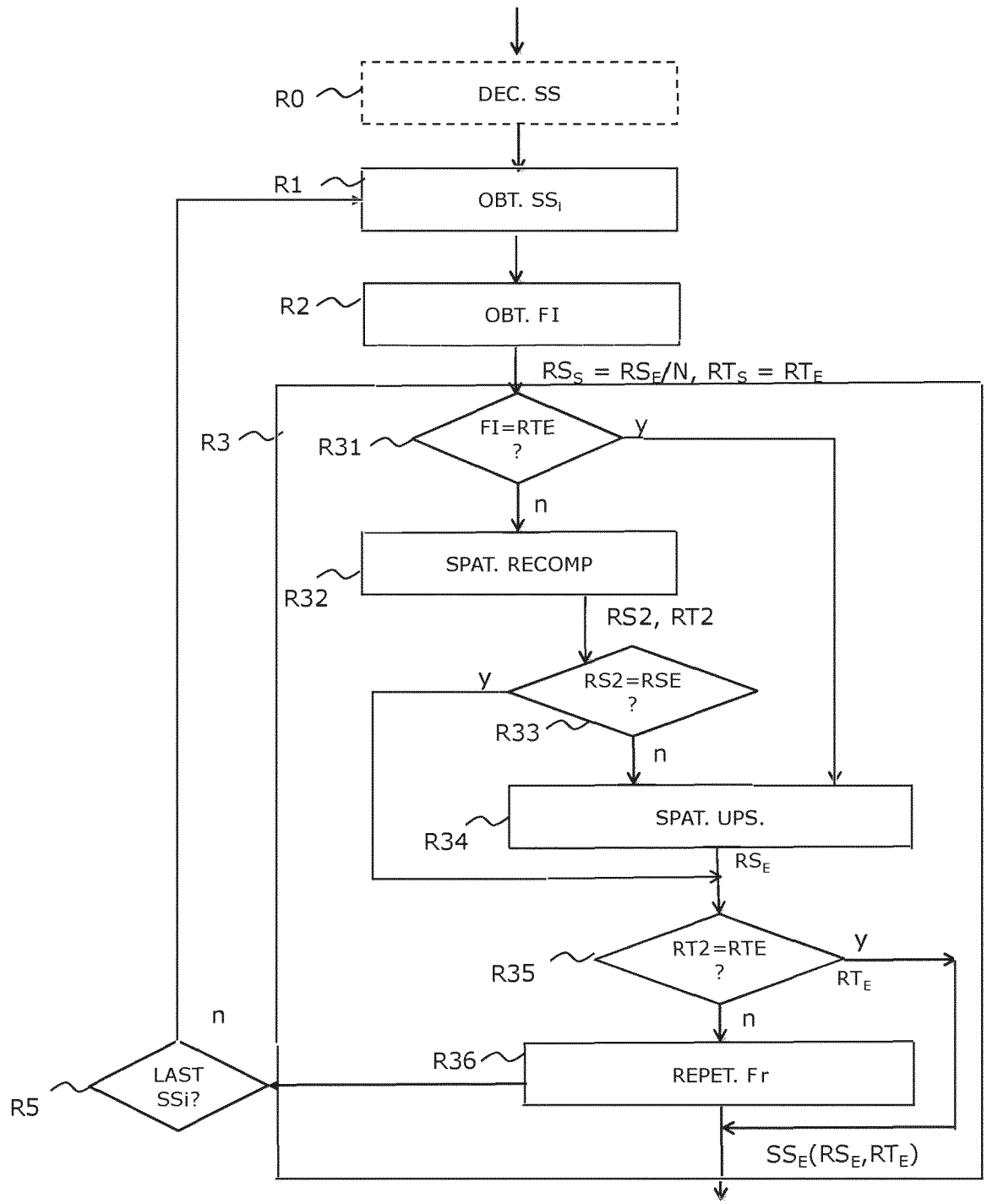
Figure 7:
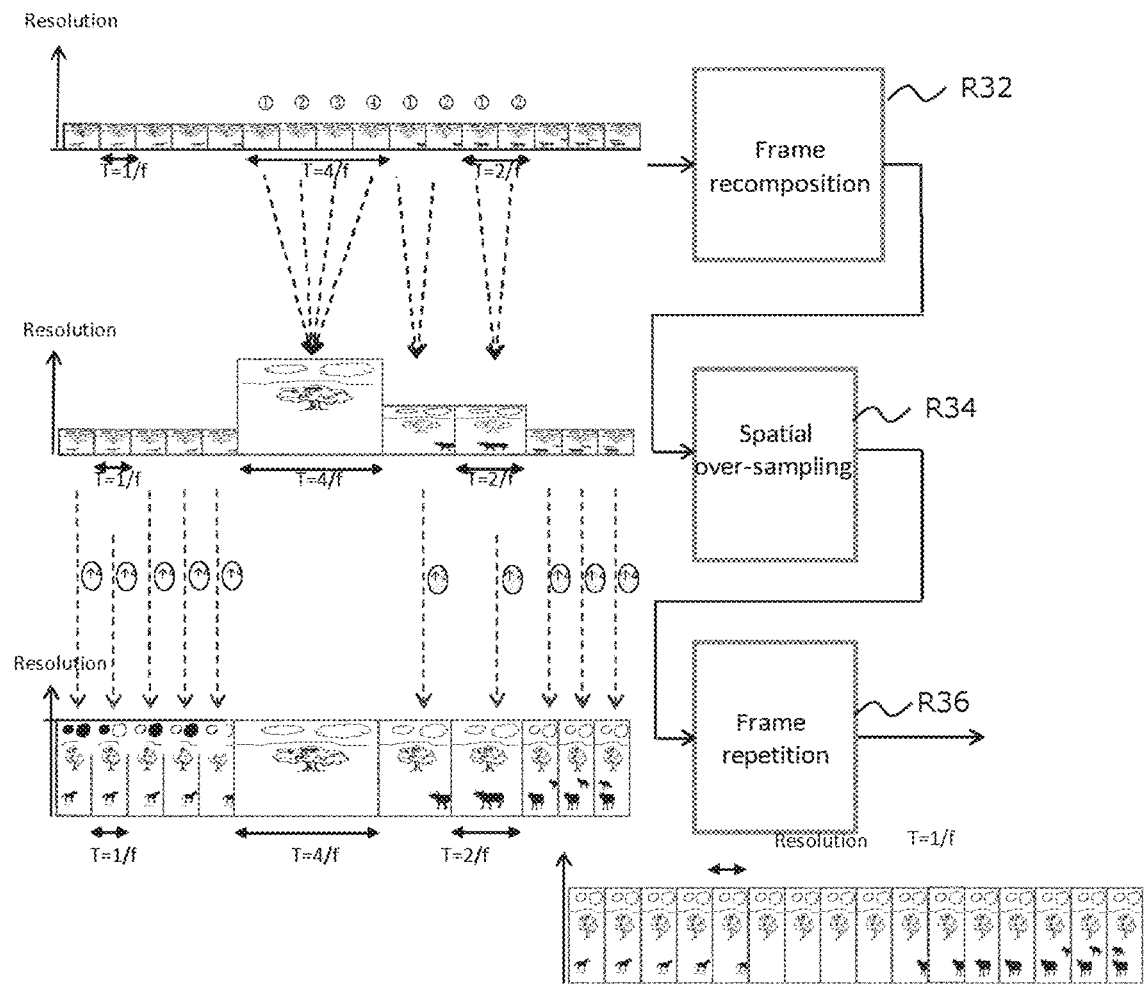
Figure 8:
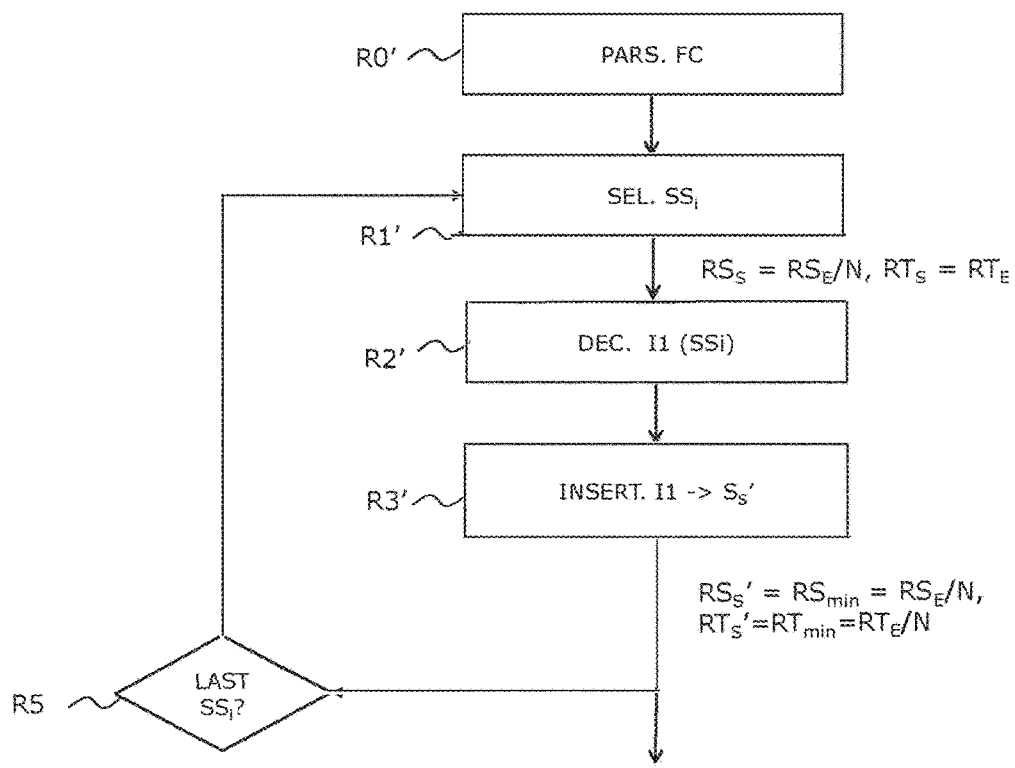
Figure 9:
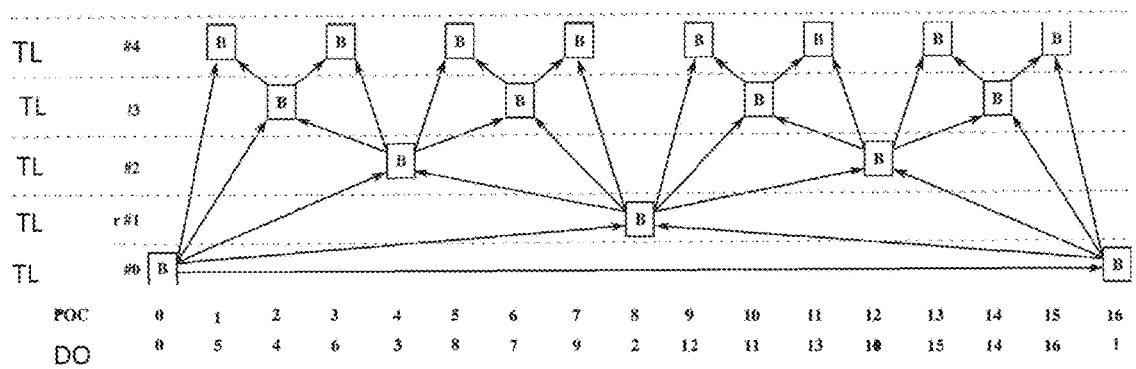
Figure 10:
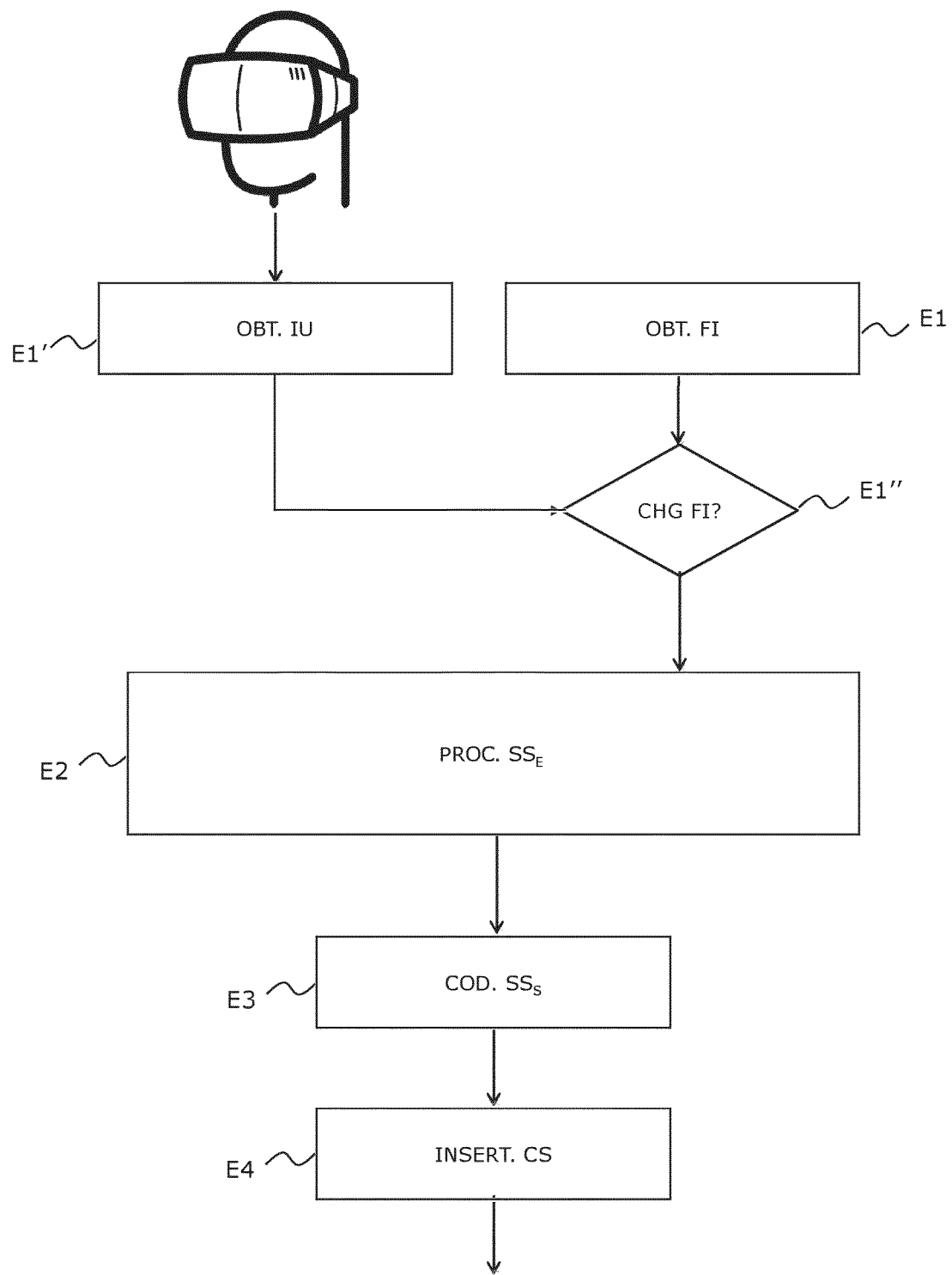
Figure 11A:
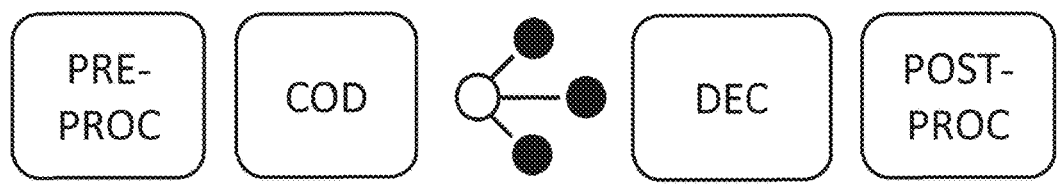
Figure 11B:
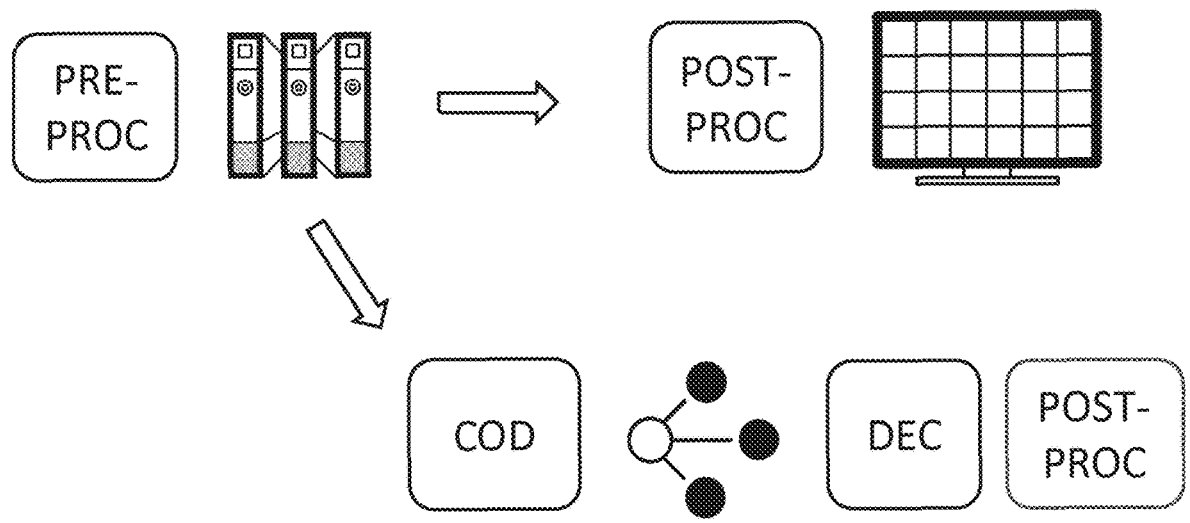
Figure 12A:
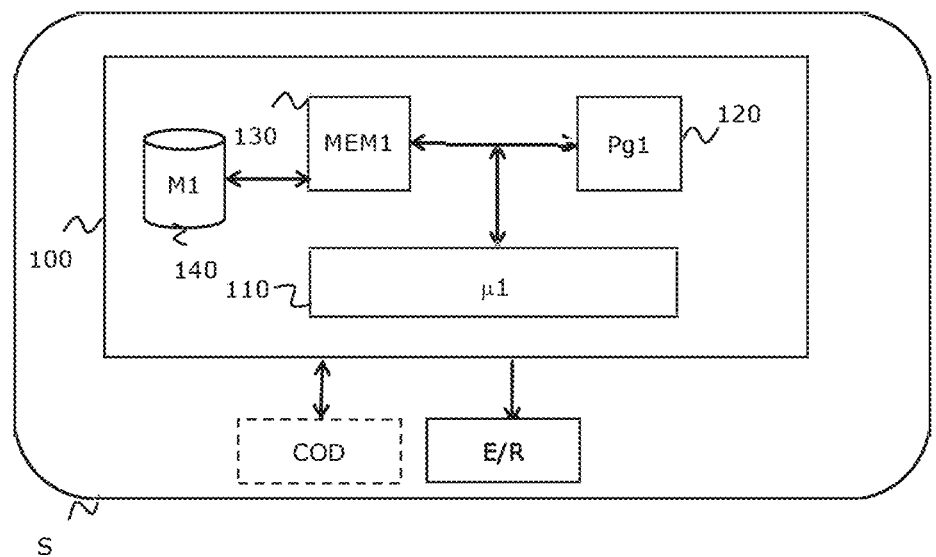
Figure 12B:
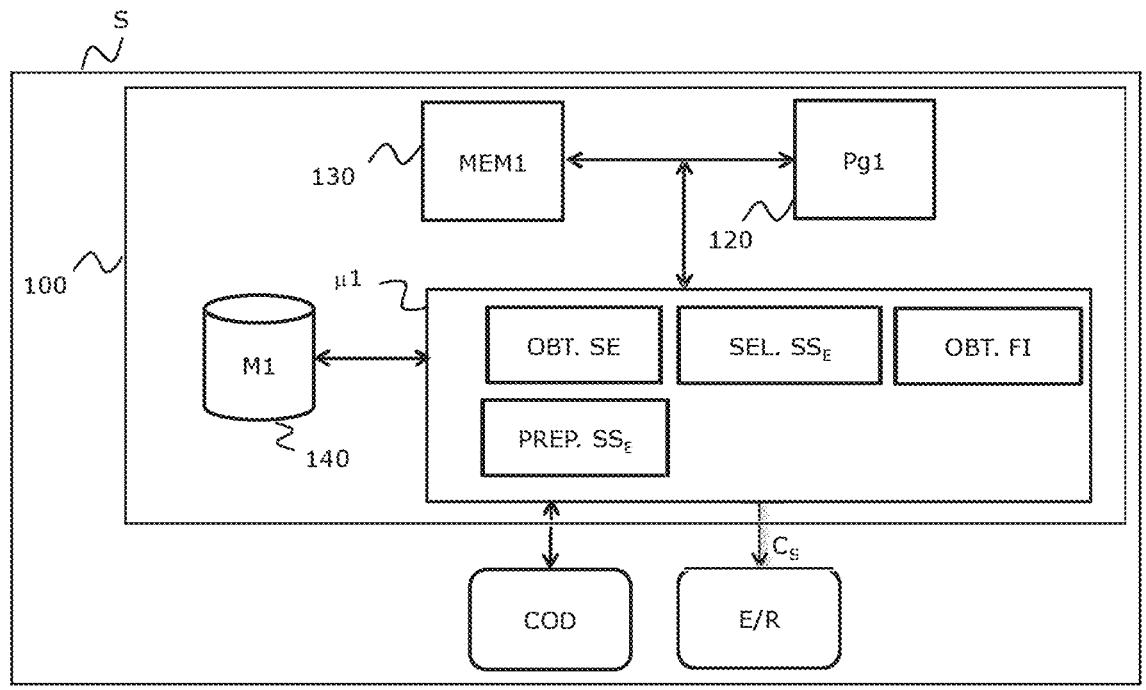
Figure 13A:
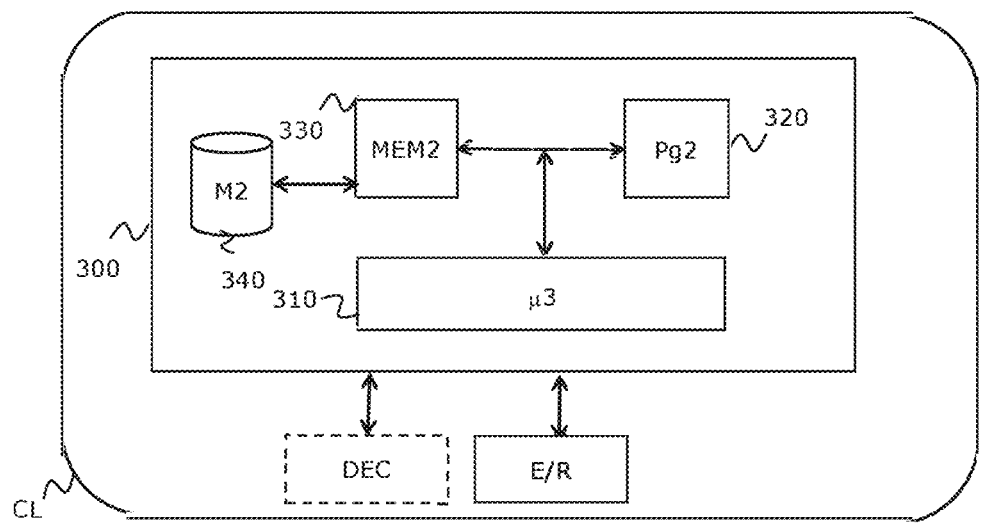
Figure 13B:
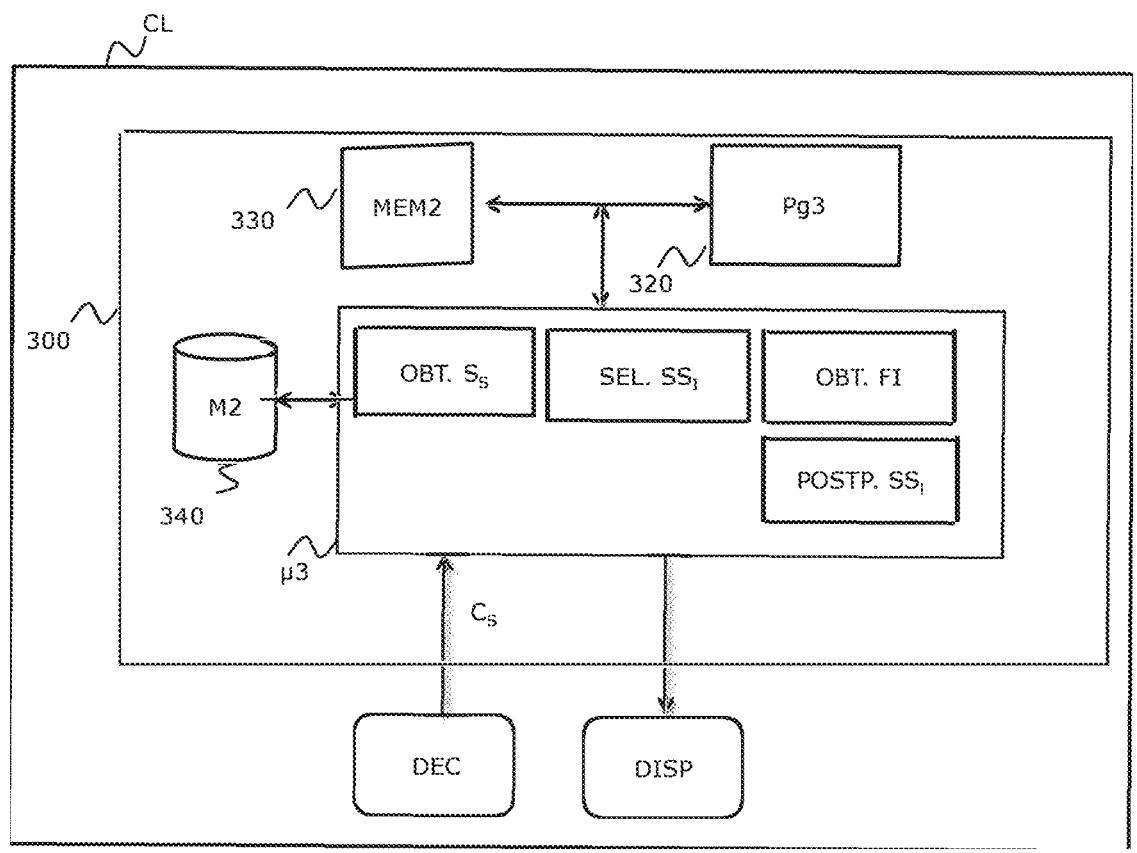
Figure 14A:
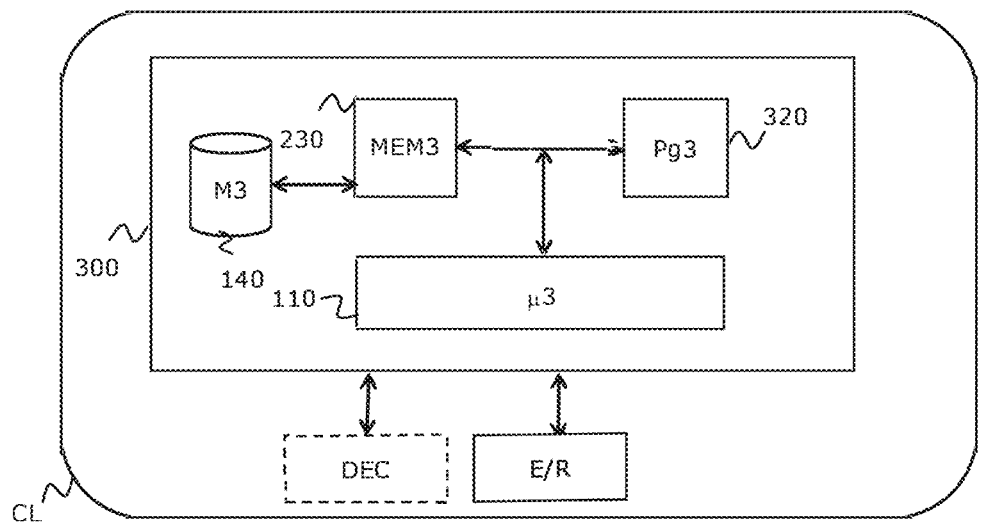
Figure 14B:
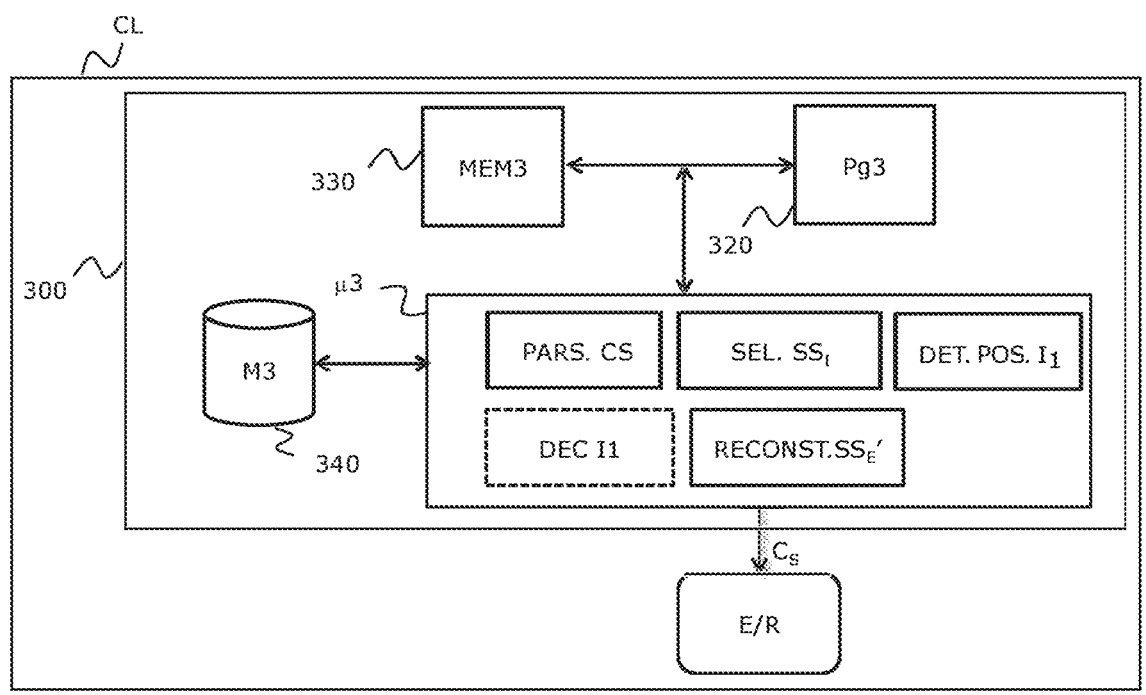
Figure 15:
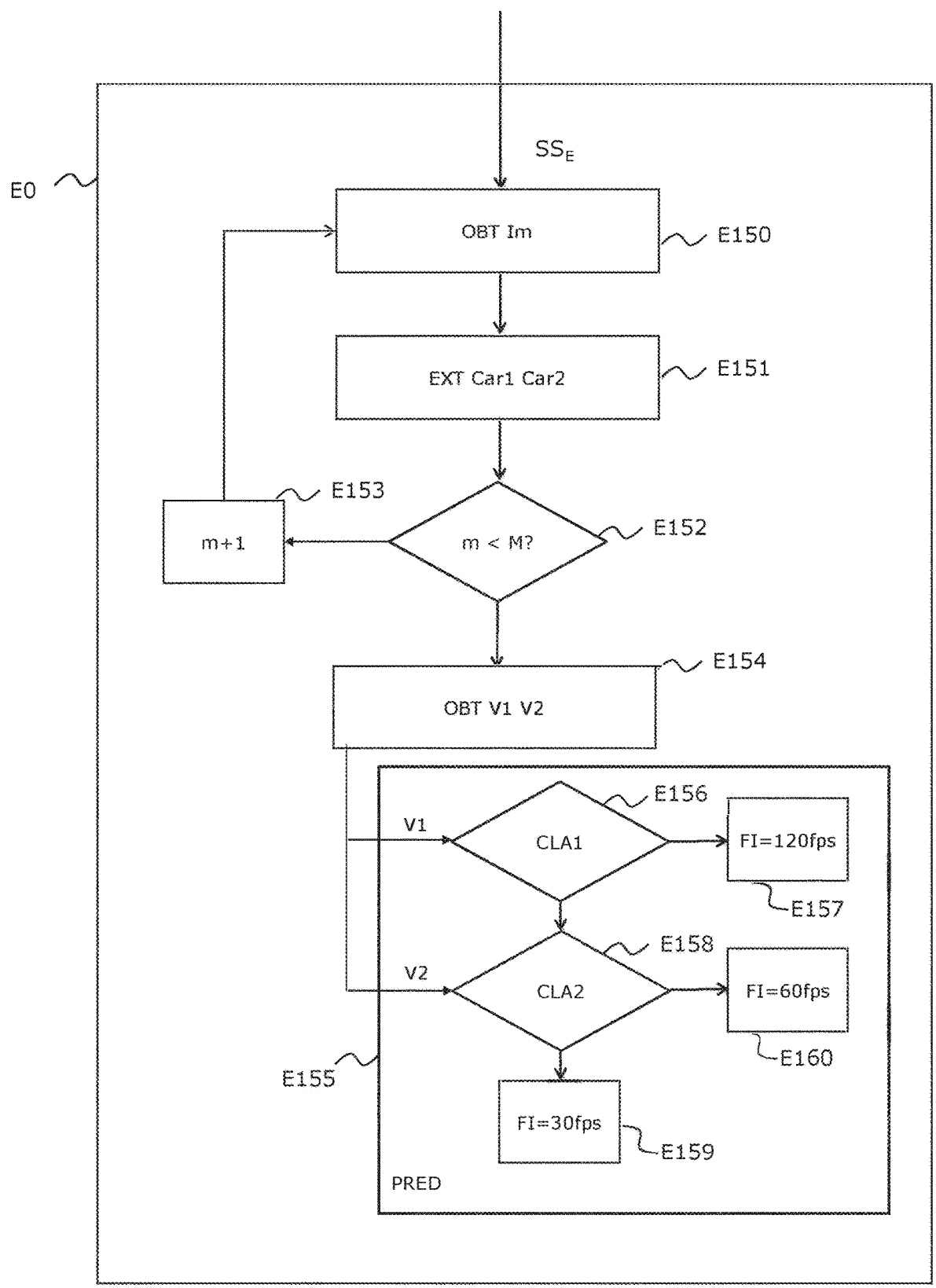

Other advantages and features of the invention will appear more clearly upon reading of the reading of the following description of a particular embodiment of the invention, given by way of simple illustrative and non-limitative example, and of the appended drawings, among which:

FIG. 1 schematically illustrates the steps of a method for forming an output frame sequence from an input frame sequence according to a first embodiment of the invention;

FIG. 2 schematically illustrates the steps of the method for forming an output frame sequence according to an exemplary embodiment of the invention, comprising sub-sequences of N frames, with N chosen equal to 4;

FIG. 3 schematically illustrates a first example of spatial decomposition of a frame of the input frame sequence into 4 sub-frames;

FIG. 4 schematically illustrates a second example of spatial decomposition of a frame of the input sequence into 4 sub-frames;

FIG. 5 describes in detail a step of determining a frame rate for a sub-sequence according to a second embodiment of the invention;

FIG. 6 schematically describes the steps of a method for reconstructing an input frame sequence from an output sequence according to a first embodiment of the invention;

FIG. 7 schematically illustrates the steps of the method for reconstructing an input frame sequence according to an exemplary embodiment of the invention, with a ratio N chosen equal to 4;

FIG. 8 schematically illustrates the steps of a second method for reconstructing a frame sequence according to a second embodiment of the invention;

FIG. 9 schematically illustrates an example of frame group structure used in a standard encoding scheme;

FIG. 10 schematically illustrates the steps of forming an output frame sequence according to a third embodiment of the invention, when the sequence is intended to be rendered to a user wearing a head-mounted display device;

FIGS. 11A and 11B schematically illustrate examples of use case of the invention;

FIGS. 12A and 12B schematically show examples of hardware structure of a device for forming an output sequence according to the invention, when integrated in a server appliance;

FIGS. 13A and 13B schematically show examples of hardware structure of a device for reconstructing an input sequence according to an embodiment of the invention, when integrated in a client appliance;

FIGS. 14A and 14B schematically show examples of hardware structure of a device for partially reconstructing an input sequence according to an embodiment of the invention, when integrated in a client appliance;

FIG. 15 described in detail an alternative of the step of determining a frame rate for a sub-sequence.

7. DESCRIPTION OF A PARTICULAR EMBODIMENT OF THE INVENTION

The invention proposes to form an output frame sequence of reduced spatial resolution from an input frame sequence of high spatial resolution. The general principle of the invention is based on the cutting of the input frame sequence into sub-sequences and the association to a sub-sequence of a frame rate adapted to its content. Each sub-sequence undergoes a temporal sub-sampling whose rate decreases with the associated frame rate, then a spatial sub-sampling that increases with the frame rate, so that a product of the applied sub-sampling rates has a constant value equal to an integer N higher than or equal to 2. A sub-sampling rate of N herein means a sampling rate of 1/N.

When the spatial resolution of the obtained sequence is higher than a fraction 1/N of the input spatial resolution, the frames of the sub-sequence are spatially decomposed so as to obtain an output sub-sequence of spatial resolution equal to a fraction 1/N of the input spatial resolution and of temporal resolution equal to the input temporal resolution.

In relation with FIG. 1, the steps of a method for forming an output frame sequence from an input frame sequence according to an embodiment of the invention are described.

In the following of the description, an input frame sequence of UHD spatial resolution and temporal resolution of 120 fps (frames per second) or Hz (Hertz) is considered, and it is desired to form an output frame sequence of spatial resolution 4 times lower (HD format) and unchanged temporal resolution.

The input frame sequence is previously cut into input sub-sequences $SS_E$ during a preliminary step E0 of analysing the sequence, which will be described hereinafter. The sub-sequences comprise a predetermined number of frames equal to a non-null integer N higher than or equal to 2.

The application of the method according to the invention to the input frame sequence is illustrated by FIG. 2.

The method comprises the succession of following steps:

During a first step E1, a sub-sequence $SS_{Ei}$, called current sub-sequence, and a frame rate FI associated with this sub-sequence, are obtained. This frame rate has been estimated during the preliminary step E0. Advantageously, it represents the minimum frame rate allowing the rendering of the frame sub-sequence without perceptible loss of quality of a final user.

In E2, a pre-processing of the current sub-sequence $SS_{Ei}$, is performed, in order to form an output sub-sequence $SS_{Si}$ having an output temporal resolution $RT_S$ equal to the input temporal resolution $RT_E$ and an output spatial resolution $RS_S$ equal to a predetermined fraction 1/N of the input spatial resolution $RS_E$ by the integer number N. In the considered example, N is equal to 4. This step comprises the following sub-steps:

Temporally sub-sampling E2₁ the current sub-sequence with a temporal sampling rate comprised between 1 and the predetermined fraction 1/N, decreasing with the obtained frame rate, and forming a sub-sequence SSEi1 having a second temporal resolution $RT_2$. For example, it is supposed that three values of frame rate FI are possible, for example equal to 120, 60 and 30 fps, corresponding to high, mean, low class of movement, respectively. For a low class of movement, the sub-sampling rate will be of ¼, as for sub-sequence SSE2 of FIG. 2, for a mean class of movement, it will be of ½, as illustrated by sub-sequence SSE3 of FIG. 2, and, for a high class of movement, it will be of 1 (i.e. no sub-sampling). This is the case of sub-sequence SSE1 of FIG. 2.

Such a decimation deletes the useless frames according the frame rate associated with the sub-sequence:
For FI=120 fps: no frame deletion
For FI=60 fps: deletion of every other frame
For FI=30 fps: deletion of three frames out of four.

Spatially sub-sampling E2₂ the formed second sub-sequence SSi₁ with a spatial sampling rate comprised between 1 and the predetermined fraction 1/N, decreasing with the frame rate, so that a product of the temporal and spatial sampling rates is equal to the predetermined fraction 1/N and forming a third sub-sequence SSi₃ having a third spatial resolution RS₃. If considering the example of the first sub-sequence SSE1 illustrated by FIG. 2, the sub-sequence SSE11 is sub-sampled with a rate of 4 and the obtained sub-sequence SSE12 has a spatial resolution equal to the output spatial resolution RSS. The sub-sequence SSE31 is sub-sampled with a rate of 2 and the obtained sub-sequence SSE32 has a spatial resolution equal to twice the output spatial resolution. The sub-sequence SS21 is sub-sampled with a rate of 1 (i.e. is not spatially sub-sampled) and the obtained sub-sequence SS22 has a spatial resolution equal to 4 times the output spatial resolution RSS. As a summary, the resolution of the frames of the current sub-sequence is reduced according to its associated frame rate FI:
If FI=120 fps: reduction of the resolution by four (from UHD to HD)
If FI=60 fps: reduction of the spatial frequency by two (from UHD to ½ UHD)
If FI=30 fps: no reduction of the spatial frequency (staying in UHD).

Advantageously, in the case of FI=60 fps, a horizontal or vertical direction of the spatial sub-sampling is chosen as a function of the content of the frames of the sub-sequence. For that purpose, already-calculated measurements are exploited to determine the frame rate of the input sub-sequence, as for example gradients and their main direction. Two possibilities are hence obtained at 60 fps:
FI=60 fps+horizontal direction: reduction of the spatial frequency by two in the horizontal direction (from UHD to ½ UHD H=1920 pixels×2160 lines)
FI=60 fps+vertical direction: reduction of the spatial frequency by two in the vertical direction (from UHD to ½ UHD V=3840 pixels×1080 lines).

At this stage, the amount of information contained in the output sub-sequence SSS has already been reduced by a ratio of 4 with respect to the input sub-sequence SSE, because the conjunction of the spatial sub-sampling and of the temporal decimation gives a ratio N=4 whatever the frame rate associated with the input sub-sequence. It results therefrom that the invention allows the storage of the video after processing in a file four times smaller than that of the source video. The invention hence allows facilitating the intermediate storage or the archiving of the video content.

However, if, for the sake of further reducing the bit rate required for the transmission of the video, it is contemplated to use a standard codec, the proposed format is not adapted because most of the existing codecs operate with input videos whose spatial and temporal resolutions are fixed. Now, this is not the case of the sub-sequences resulting from the two preceding sub-sampling steps.

This is hence here that the additional following step intervenes:

When the third spatial resolution RS₃ is higher than the output spatial resolution RS_S, spatially decomposing E2₃ the frames of the third sub-sequence into at least two sub-frames and at most N sub-frames of spatial resolution equal to the output spatial resolution (RS_S). For the sub-sequence SSE12, the spatial resolution is already equal to RSS, hence nothing is done. For the sub-sequence SS22, the spatial resolution is equal to the spatial resolution of SSE2, hence its frames are decomposed into N=4 sub-frames. For the sub-sequence SSE22, the spatial resolution is equal to twice the output spatial resolution, hence its frames are decomposed into N=2 sub-frames.

It is hence obtained:
  If FI=120 fps and RS3=RSS=HD resolution: no decomposition
  If FI=60 fps and RS3=½ UHD H: vertical decomposition into two HD frames
  If FI=60 fps and RS3=½ UHD V: horizontal decomposition into two HD frames
  If FI=30 fps and RS3=UHD: decomposition into HD frames.

Such a spatial decomposition can be made in several manners as long as it contributes to transforming a spatial redundancy into a temporal redundancy. Indeed, the standard encoders conventionally take advantage of this temporal redundancy to compress the information contained in a frame sequence. The matter is hence to allow a standard codec to operate on the frame sequence it receives as an input. Hereinafter, two different methods are proposed, but the invention is not limited to these examples and any other method could be used.

The first method is the polyphase decomposition (sometimes called "lazy wavelet"), known to the person skilled in the art, which amounts to perform a sub-sampling of an input frame with a different phase for each sub-frame. Its principle is illustrated in FIG. 3.

In the case where N=4, it is easily understood that the four sub-frames obtained will have a high correlation because they result from the same source frame. The main advantage of this method is its very great simplicity. Its drawback is that it does not respect the Shannon theorem and that it hence introduces a spectral aliasing in presence of high spatial frequencies in the source.

The second method, illustrated by FIG. 4, is based on a decomposition of the source frame into wavelets. Among the wavelets commonly used in the field of video, it is preferable to choose those whose implementation remains simple. Hence, the Haar ones, described for example at the link: https://en.wikipedia.org/wiki/Haar_wavelet, or also the Le Gall 5/3 ones, described for example in the document of D. Le Gall et al., entitled "Sub-band Coding of Digital Images using Symmetric Short Kernel Filters and Arithmetic Coding Techniques", published by IEEE in the proceedings Acoustics, Speech, and Signal Processing, in 1988 (ICASSP, International Conference on IEEE, 1988, pp. 761-764), seem well adapted. The Haar and Le Gall wavelets suit well to the searched decomposition, but other wavelets could certainly be used.

Whatever the type of wavelength used, in the case where N=4, the decomposition produces 4 sub-bands: LL, LH, HL and HH. The sub-band LL corresponds to the low rates of the frame, whereas LH, HL and HH respectively correspond to the horizontal, vertical and diagonal high rates. In order to be able to form the output sub-sequence at the desired spatial and temporal resolutions, the three high-rate frames obtained in LH, HL and HH are retransformed into wideband frames by simply adding to them the frame LL.

It is to be noted that, for a value of N higher than 4, as for example N=8 or 16, the spatial decomposition can be performed by means of a "Wavelet Packet Decomposition", known to the person skilled in the art and described, for example, at the link: https://en.wikipedia.org/wiki/Wavelet_packet_decomposition.

In $E2_4$, the output frame sub-sequence SSSi is formed by temporally inserting the N=4 sub-frames resulting from the decomposition at successive moments between the decomposed frame and the following frame.

In $E2_5$, the output frame sequence is formed by temporally inserting the formed sub-sequence SSi.

In E5, it is tested whether it remains sub-sequences to be processed. If so, steps E1 and E2 are repeated for the following sub-sequence. It is to be noted that the sub-sequences can be obtained by means of a sliding window. That way, two consecutive sub-sequences of the input frame sequence have one or several frames in common, which allows switching more rapidly to a higher frame rate and hence increasing the reactivity of the system.

An output sequence of spatial resolution $RS_S=RS_E/N$ and temporal resolution RTS=RTE is obtained. In the case where N=4 and the output sequence is in HD format at 120 fps.

During an optional step E3, the obtained sequence $SS_S$ is transmitted to an encoder. It is preferentially a standard encoder, for example compliant with the AVC ("Advanced Video Coding") or HEVC ("High Efficiency Video Coding") standard or their future extensions (VVC, etc.). An encoded data stream is obtained.

In order to facilitate the post-processing operation after decoding, it is necessary to signal, for each frame, the frame rate FI of the sub-sequence $SS_i$, to which it belongs and its temporal position in this sub-sequence.

For example, the temporal position information is an index pointing to the frame number in the sub-sequence $SS_{Si}$. For N=4 and FI=30 fps, the index takes an integer value between 0 and 3. For FI=60 fps, the index will be 0 or 1. 2 bits are hence sufficient to signal the frame rate and from 0 to 2 bits are sufficient to encode the frame index:
  120 fps=0 encoded in 2 bits;
  60 fps H=1+ frame index number in 1 bit;
  60 fps V=2+ frame index number in 1 bit;
  30 fps=3+ frame index number in 2 bits.

This information can for example be transported explicitly by a stream of private data as supported in most of the codecs, as for example the messages of the SEI ("Supplemental Enhancement Information") type in the MPEG AVC and HEVC standards.

As an alternative, this information is obtained from metadata already present in the encoded data stream. It is talked about implicit signalling. For example, the frame rate FI may be deduced from temporal information of the PTS ("Presentation Time Stamp") type associated with each frame of the sequence. Indeed, the spacing between two successive PTS corresponds to the frame display duration, which is equal to the inverse of the frame rate. In the same way, the index number may be reset to 0 at each rate change.

According to a similar principle, the "Time Code" information, which are for example conveyed in the HEVC SEI messages, could also be used. When the time code remains identical in 4 successive frames, that means that the sub-sequence has a frame rate corresponding to the lowest temporal resolution, whereas, if it is changes at each frame, its frame rate has the maximum value. As regards the index, it is reset to zero when the time code starts evolving again after having been frozen.

In E4, the encoded data representative of the output sub-sequence SSS are inserted into an output container $C_S$.

In relation with FIG. 5, the preliminary step E0 of analysing the input frame sequence is now described. In a first time, an analysis of the spatial and temporal content is performed to determine the minimum frame rate at which a frame sub-sequence of the input sequence can be represented without loss of perceived quality. This analysing step can rely on various types of frame processing techniques, known from the person skilled in the art. Advantageously, it relies on a classification technique implementing a supervised prediction system, of the "Machine Learning" type, but it could also use other techniques of artificial intelligence such as neural networks, for example.

The automatic prediction system relies on a previously learned model, to predict the frame rate of an input sub-sequence SSEi. This is hence a classification technique. In the preceding example, the input sub-sequence has a temporal resolution $RT_E$ equal to 120 fps with an adaptive reduction of the temporal resolution by a factor 4 (N=4), the system affects to each sub-sequence a frame rate class among three predetermined classes: Class 30 Hz, Class 60 Hz and Class 120 Hz.

Conventionally, it is proceeded in two successive phases:
a learning phase: previously performed on a library of reference video sequences. A model is calculated based on this learning.
In this phase, a library (database) of video sequences at the temporal resolution of 120 Hz must have been built. This database must be great enough (several thousands of samples of a few seconds) and contain all the representative types of video (strong movements, small movements, . . . ) of what can be met in the field of television, gaming, virtual reality, etc. This database must be "labelled", i.e. each input sample or sub-sequence must be classed (3 possible labels: Class 30 Hz, Class 60 Hz or Class 120 Hz). The labelling may be performed subjectively (by subjective visual test) or by means of an objective metric.
Advantageously, this step further comprises, for each input sub-sequence, the extraction of a plurality of spatiotemporal features. For example, one map of movement vectors per frame of the sub-sequence is computed. This map comprises the amplitude and the direction of the movement vectors of each pixel or block of the frame with respect to the preceding frame. To this movement analysis, other criteria may advantageously be combined so as to extract spatial features of the frame content. For example, horizontal and vertical gradients can be extracted, directional filters be applied, information related to a dynamics of the signal (mean value, median, standard deviation, percentiles, etc.) be extracted. Based on all these spatiotemporal elements, a feature vector of the frame is formed.
The feature vectors of the N frames of the current sub-sequence are then combined to form a single vector for the sub-sequence. For example, the $i^{th}$ feature of the subsequence vector is obtained by summing, averaging or calculation of a median of the N values of this feature for the N frames.
Of course, the invention is not limited to this type of frame analysis and can rely on any other technique known from the person skilled in the art likely to provide information about the static and dynamic content of a frame of the current sub-sequence. On the one hand, these vectors must be complex enough to efficiently represent the spatiotemporal properties of the frame and to allow the algorithm to find a good correlation between these vectors and the classes of frame rates. On the other hand, the extraction of these feature vectors must be able to be made in real time, it is hence necessary to make compromises about the complexity and the size of these vectors. The inventors have observed that, after elimination of the redundant or too mutually correlated features, a reasonable number of features of the vectors is comprised between 7 and 15. For example, a 12-component vector offers good prediction performances. This reduction of size of the feature vectors is important to guarantee a better generalization of the Machine Learning algorithm and to avoid the "overfitting" phenomena.
For each sub-sequence of the learning base, the obtained vector is associated with the label that labels the input sub-sequence in order to form a "ground-truth".
During the learning, the Machine Learning algorithm implemented by the automatic prediction system seeks to correlate the frame rate class (label) to the extracted feature vectors. Many Machine Learning algorithms, known to the person skilled in the art, may be used, as for example the "Random Forest" or the "Multi-Layer-Perceptron". In our application, the Random Forest provide very good results with prediction rates of the order of 90% correct predictions.
Once the learning phase performed, the Machine Learning algorithm produces a prediction model that will thereafter be exported and used for the prediction of the frame rate class from the feature vectors.
a real-time prediction phase: it reuses the previously learned and computed model to classify the sub-sequences that are input in the automatic prediction system.
For each sub-sequence of the incoming video, a feature vector (same features as in the learning phase) is extracted in real time from spatiotemporal features. The Machine Learning model computed in the learning phase is used to predict in real time (at each sub-sequence) the frame rate class that must be applied (Class 30 Hz, Class 60 Hz or Class 120 Hz).

FIG. 15 illustrates an alternative to the preliminary step E0 of analysing the input frame sequence. An object of this alternative is to determine the lowest frame rate for a given sub-sequence, without a degradation of quality with respect to the input video sequence UHD can be perceived. In this example, three classes of movement are considered, respectively associated with the frame rates 120 fps (UHD), 60 fps and 30 fps. Of course, the number of classes, hence the frame rates, are given herein by way of example and are not limitative in any way.

For a given input sub-sequence $SS_E$, a frame Im is obtained, step E150, from which a first feature set Car1 and a second spatiotemporal feature set Car2 are extracted, step E151. Each set forms a feature vector peculiar to the frame. These features, described hereinabove, may be specific to each set or, conversely, identical for the two sets or also identical for only a part of them. These features are preferably chosen so as to reduce the complexity of the classification steps described hereinafter.

Once the feature sets extracted, it is tested, at step E152, whether the processed frame Im is the last frame M to be processed, M being an integer. M may correspond to the total number of frames of the input sub-sequence $SS_E$ or else to the number of a predetermined part of the frames of this input sub-sequence $SS_E$, if all its frames are not to be processed. For example, M may be the number of Inter-type frames of the input sub-sequence $SS_E$, if the feature sets are extracted only from Inter-type frames. If the considered frame is not the last one, the rank of the frame to be processed is incremented (m+1), step E153, and steps E150 to E152 are reiterated up to the last frame to be processed.

At step E154, a first feature vector V1 is obtained from the first feature sets or only a part of these first feature sets (for example, if certain first feature sets correspond to frames duplicated within the same sub-sequence). Likewise, a second feature vector V2 is obtained from the second feature sets or only a part of these second feature sets. Obtaining feature vectors for the input sub-sequence $SS_E$ has been described hereinabove, with reference to FIG. 5.

A frame rate prediction step E155 is then performed based on the first feature vector V1 and possibly on the second feature vector V2.

A first step E156 implements a first classification method. This classification method is preferably a "Random Forest Classifier" classification method. This method is for example described in "Random Forests", Leo Breiman, in *Machine Learning*, 45, 5-32, 2011, *Kluwer Academic Publishers*. The first method is capable of deciding if the frame rate FI associated with the input sub-sequence $SS_E$ must be maintained at the highest value, herein 120 fps (UHD) or if it can be reduced, this decision being based on the values of the first feature vector V1.

If the first classification method, herein binary, decides to class the considered input sub-sequence $SS_E$ in the frame class "Class 120 Hz" corresponding to the frame rate 120 fps, a frame rate FI of 120 fps is then obtained. If, on the contrary, the first classification method decides that the frame rate can be reduced without visual impact, a second classification method selects, during a second step E158, another class associated with a lower rate (herein 60 fps or 30 fps). This selection is performed from the second feature vector V2. As a function of the values of the second feature vector V2, the second classification method, herein binary, selects the lowest rate value without impact on the visual quality. If the lowest frame rate can be selected, the frame class "Class 30 Hz" corresponding to the frame rate 30 fps is then selected. The corresponding frame rate FI of 30 fps is hence obtained, step E159. Otherwise, the rate class "Class 60 Hz" corresponding to the intermediate frame rate 60 fps is selected. The corresponding frame rate FI of 60 fps is hence obtained, step E160.

As a variant, the second feature set and the corresponding second feature vector can be respectively extracted and obtained only if the first classification method decides that the frame rate can be reduced. Hence, successive feature sets can be extracted, and feature vectors be obtained, as long as the class of movement associated with the minimum possible frame rate is not obtained.

As a variant, one or the classification methods are so-called multiclass methods, i.e. methods that make it possible to select one class among P classes, P being an integer higher than 2.

Said preliminary step E0 then comprises the following steps (not shown for the sake of simplification):
   extracting a first feature set from at least a part of the frames of said sub-sequence;
   forming, for said sub-sequence, a first feature vector from at least a part of the first feature set of the frames of the group of frames;
   predicting a class of movement of the considered sub-sequence by means of at least one classification method, a first classification method being adapted to select or not, from the first feature vector, a first class of movement for said sub-sequence, and if said first class of movement is not selected, said preliminary step further comprises the following steps:
      extracting, for each frame of a group of frames of said sub-sequence, at least a second feature set;
      forming, for said sub-sequence, a second feature vector from at least a part of the second feature set of the frames of the group of frames;
      predicting a class of movement of the considered sub-sequence by means of a second classification method, the second method being adapted to select, from the second feature vector, a second class of movement or a third class of movement for said sub-sequence,
   obtaining the frame rate associated with the selected class of movement.

In the general case where K classification methods are used (K being an integer), the preliminary step E0 comprises the following sub-steps, that are immediately deduced from what precedes:
   extracting K feature sets for each frame of at least a part of the frames of said sub-sequence;
   forming, for said sub-sequence, K feature vectors, the $k^{th}$ feature vector being formed from at least a part of the $k^{th}$ feature set extracted for the considered frames, k being an integer comprised between 1 and K;
   predicting a class of movement of the considered sub-sequence by means of K classification methods, the $(K-1)^{th}$ first methods being adapted to select or not, from the feature vector of corresponding rank, a pre-determined class of movement for said sub-sequence, the $K^{th}$ method being adapted to select, if no class of movement has been selected by the preceding methods, a $K^{th}$ or $(K+1)^{th}$ class of movement from the $K^{th}$ feature vector;
   obtaining the frame rate associated with the selected class of movement.

The classification methods have been previously trained by means of chosen database. Preferably, specific training databases have been prepared for each classification method.

A first database for training the first classification method is obtained from video sequences at 120 fps, a first set of sequences being labelled 120 fps and a second set of sequences being labelled 30 fps on the one hand and 60 fps on the other hand.

The labelling of the sequences consists, by means of a subjective expert test, to associate therewith the minimum rate that produces no visual degradation.

Preferably, the two sets of sequences have the same size, so as not to favour a class during the training. Indeed, the probabilities to have either one of the classes in the conventional multimedia content are a priori equal.

A second database for training the second classification method is obtained from video sequences at 120 fps, a first set of sequences being labelled 60 fps and a second set of sequences being labelled 30 fps, these two sets having preferably the same size.

The first and the second databases are consisted of features representative of different metrics relevant for the associated classification method, allowing the better discrimination between the two possible choices. For example, as already explained hereinabove, one of the metrics used may be movement information (for example, movement vectors). The luminance values of the pixels and the directional gradients obtained on the frames of the database can be metrics particularly interesting for detecting the blinking that appears during the viewing of a video at a too low rate.

The metrics used may be identical for the two database or completely or partially different.

The features chosen to form the first database are those which are extracted to form the first feature set Car1 (step E151). Likewise, the features chosen to form the second database are those which are extracted to form the second feature set Car2.

It is now supposed that the output container $C_S$ is received by a client appliance. It implements a method for reconstructing a frame sequence from this output container, according to a first embodiment of the invention, which will now be described in relation with FIG. 6. An example of reconstruction of a UHD frame sequence is illustrated by FIG. 7.

The stream of data representative of the input frame sequence may be compressed. In this case, during an optional step R0, it is decoded by a standard decoder, dual of the encoder used by the server appliance. A decoded frame sequence $SS_S$ is obtained.

During a step R1, a sub-sequence SSi to be processed is extracted therefrom. In R2, a frame rate FI associated with this sub-sequence is obtained. It may be obtained from additional information explicitly signaled in a header of the container CS, as for example the above-mentioned SEI field, or deduced from metadata conventionally present in the container. This is then an implicit signalling. Additional information related to a direction, horizontal or vertical, of spatial recomposition as well as an index number are further obtained for each frame of the sub-sequence.

The reconstruction of the input frame sequence SE then comprises a post-processing R3, illustrated by FIG. 7, comprising the steps dual to those of the pre-processing:

In R31, it is tested whether the frame rate FI associated with the current sub-sequence SSi is equal to the temporal resolution RTS of the received frame sequence SS. If so, the process goes to step R3 of spatial over-sampling.

Otherwise, in R32, a recomposition of the frames of the sub-sequence SSi is performed dually with respect to the pre-processing, so as to obtain a temporal resolution RT2 equal to the frame rate FI. In the example previously described for the pre-processing, the temporal resolution of the output sequence is 120 fps. If the frame rate FI associated with the current sub-sequence SSS is 60 fps, then a frame will be recomposed from two successive frames of the sub-sequence. If the frame rate FI associated with the current sub-sequence SSi is 30 fps, then a rate will be recomposed from 4 successive frames of the sub-sequence.

If a polyphase decomposition has been applied, the recomposition simply consists in a re-interleaving of the pixels of 2 or 4 successive frames according to their initial phase. If a wavelet decomposition has been performed on 4 frames, the first frame LL is subtracted from the 3 following ones, in order to find the frames LH, HL et HH. In the case of a wavelet decomposition on two horizontal (or vertical) frames, the first frame LL is subtracted from the following one, in order to find the frame LH, respectively HL.

A current sub-sequence of spatial resolution RS2 higher than the resolution RSS of the obtained sub-sequence and of temporal resolution lower than the temporal resolution RTS of the obtained sub-sequence is hence obtained.

At the end of this step, in R33, it is tested whether the spatial resolution RS2 of the current sub-sequence is equal to the desired spatial resolution RSE for the reconstructed frame sequence. If so, the process directly goes to the frame repetition step R36.

Otherwise, the spatial resolution RS2 is lower than the desired spatial resolution RSE, in R34, a step of spatial over-sampling of the frames of the current sub-sequence is hence performed, so as to reach the maximum resolution RSE.

In the example considered hereinabove, the highest spatial resolution is UHD. For a current sub-sequence having frames at the spatial resolution RS2=½ UHD, this corresponds respectively to an over-sampling by 2. For a spatial resolution RS2=HD, this amounts to performing an over-sampling by 4. After this operation, the frames of the current sub-sequence are all at the maximum spatial resolution RSE.

During a step R35, it is tested whether the temporal resolution RT2 of the current sub-sequence is equal to the desired temporal resolution RTE for the reconstructed sub-sequence. If so, the post-processing is finished for the current sub-sequence. Otherwise, a step R36 of frame repetition is performed in order to increase the temporal resolution of the sub-sequence. For example, for a temporal resolution of 60 fps, a copy of each frame is made, and the copy is inserted between this frame and the following one in the sub-sequence. For a temporal resolution equal to 30 fps, the copy of the current frame is inserted three times in a row in order to obtain a sub-sequence of temporal resolution RTE=120 fps.

At the end of this last operation, a current sub-sequence is hence found in the format of the original sequence, i.e. the maximum resolution (UHD) and the maximum frame rate (120 fps).

In R37, it is inserted into a container after the previously reconstructed sub-sequence.

In R38, it is tested whether it remains sub-sequences to be processed. If so, the following one is obtained, and the just-described steps are repeated. Otherwise, the process is ended.

In the just-described particular example described in relation with FIG. 2 for the formation of an output sequence and FIG. 7 for the reconstruction of the input sequence, the input sequence is in UHD format with 120 fps and the spatial resolution is reduced by a factor N=4. Of course, the invention is not limited to this example and can be applied as well to other frame formats and to other values of N. For example, the frame sequence format 8K is considered, which corresponds to a spatial resolution of 7680×4320 pixels and a temporal resolution of 240 fps, and a factor N equal to 16 is chosen. Sub-sequences comprising N=8 frames are hence considered. In this example, four levels of frame rate FI could be contemplated, which would then entail the possibility of providing 5 distinct classes of sub-sequences during the automatic classification step. The spatial and temporal resolution levels would be the following:

8K at 15 fps;
½ 8K (Horizontal or Vertical) at 30 fps;
4K at 60 fps;
½ 4K (Horizontal or Vertical) at 120 fps; and
HD at 240 fps.

Based on these 5 frame rates, 7 distinct modes of pre-processing of an input sub-sequence and a frame index from 0 to 15 would hence be obtained.

As a variant, to pre-process an input sequence in UHD format at 100 fps, a sub-sequence size of N=4 frames could be kept, but the classes of spatiotemporal resolutions would become:

4k at 25 fps;
½ 4K at 50 fps; and
HD at 100 fps.

An advantage of the just-described invention is that it produces an output frame sequence that is not only less expensive to be stored and transmitted, but also natively scalable. This last property is in particular provided by the spatial decomposition of the frames of spatial resolution higher than RSE/N into N sub-frames, then the formation of frames of spatial resolution RSE/N based on these sub-frames and their insertion into the output sequence SSS, made by the invention. Indeed, it offers to a client appliance receiving the output sequence the possibility to obtain directly a sequence of frames with minimum spatial and temporal resolutions RES/N and RTE/N (HD 30 fps in the previous example), based on the received data stream.

For that purpose, according to a second embodiment of the invention, a client appliance implements a second method for reconstructing a frame sequence from the received data stream, the reconstructed frame sequence comprising a minimum spatial resolution and a minimum temporal resolution. The steps of this second reconstruction method will now be described in relation with FIG. 8.

It is supposed herein that the data stream received by the client appliance comprises encoded data. For example, the client appliance has limited calculation power.

During a step R0', it parses the encoded data stream, and in particular the signalling information contained in its headers, to extract at least one size N of the sub-sequences. In R1', it selects a sub-sequence to be processed SSi and it determines in R2' a position of its first frame I1. The position of the Intra frames will for example be used to determine the beginning of a sub-sequence, which comprises N frames. It is then decoded by a conventional decoder in R3'. The N-1 other frames of the sub-sequence are hence not decoded, which reduces significantly the load of the client appliance.

In R4', this first frame I1 is inserted into an output frame sequence SS' with a frame number corresponding to the number of the current sub-sequence SSi and a frame rate corresponding to the minimum temporal resolution $RT_E/N$.

In R5', it is tested whether it remains sub-sequences to be processed. If so, the sequence of steps R0' to R4' is repeated.

It is understood that, contrary to the first reconstruction method according to the invention, this second method does not perform the post-processing dual of that performed by the output sequence forming method according to the invention, but it produces a sequence SS' of minimum spatial and temporal resolution from this output sequence.

This particular aspect of the invention may advantageously be exploited by an energy or power-constrained client appliance as a mobile phone or also to provide a degraded processing mode in case of bad quality connection showing a high error rate.

However, the possibility to decode only one frame out of N requires that the structure of the group of pictures GoP used by the codec is adapted and that, in particular, the frames decoded by the decoder have not been exploited by the encoder to predict the frames to be decoded. This condition is satisfied, when the first frame of the sub-sequence is a frame of the INTRA or I type, because these frames are not predicted. On the other hand, the beginning of a sub-sequence does not necessarily coincide with the beginning of a GoP. In relation with FIG. 9, a hierarchical layer-based GoP structure may be adapted. Indeed, it concentrates in its lowest layers the frames that can be decoded independently of those belonging to the highest layers. For example, it may be ensured that the first frame of each sub-sequence belongs to the layers TL 0, 1 or 2.

The just-described invention finds applications in particular in a context of virtual, increased or mixed reality. The head-mounted display device is connected to a server appliance that stores the input sequence and forms an output sequence on the fly as a function of the interactions of the user with its virtual environment. Each time the user interacts with the scene, the latter is modified and a new frame sequence must be transmitted to the head-mounted display device so that the latter can render the modified scene and display it on the screen of the head-mounted display device. It is understood that, in this use case, the transmission capacities of the wireless connection between the head-mounted display device and the server appliance are limited. With the invention, the memory size occupied by the sequence before coding is reduced by a factor N, where N is an integer higher than or equal to 2. It hence makes it possible to reduce the latency of transmission and/or to allow a multi-user use of the virtual environment or also to take advantage of the bandwidth saving to offer a better security of transmission of the content.

In relation with FIG. 10, a third embodiment of the invention intended for this use case will now be described. This aspect of the invention allows improving the reactivity of the rendering by taking into account the interactions of the user with the scene, as a movement of the head or the fact to act on an object. Indeed, increasing the frame rate contributes to reducing the latency between the moment of interaction and the moment when it is taken into account in the display of the head-mounted device.

In FIG. 10, steps E1 to E4 of the output sequence forming method are unchanged, but the method comprises an additional step E1' of obtaining information representative of an interaction of the user with the scene and a step E1" of deciding whether to change the frame rate FI associated with the current sub-sequence in E1.

As regards obtaining the information related to an interaction of the user with the scene, several embodiments can be contemplated. According to a first option, it comprises a sub-step of obtaining information representative of a head movement of the user. For example, this information comprises angle measurements that are transmitted at the rhythm of the frames displayed in the head-mounted display device. Advantageously, these measurements are three measurements of Euler angles, commonly called "yaw, pitch, roll". The decision to change the frame rate is taken on the basis of these measurements, which are compared to predetermined thresholds. For example, if at least one of the measurements varies by more than 3° between two successive frames, then the frame rate is fixed to its maximum value. In the example described hereinabove, the maximum value is of 120 fps. When the user moves his head, this modifies the portion of scene he perceives in its field of view. Selecting the highest frame rate allows refreshing the video the most frequently possible according to the users moves. This reactivity is desirable so that the user does not feel this difference between his moves and the displayed scene, which may sometimes lead to a discomfort liable to make him feel nauseous.

According to a second option, the obtained information further comprises information related to an interaction of the user with an object of the scene, which he displaces or enlarges, for example. In this case, it is in the same way possible to decide to force the frame rate to its maximum value, because the field of view of the head-mounted display device also changes with the actions of the user on the virtual content.

Of course, it is possible to use a combination of two types of information to decide of the most adapted value of the frame rate.

In relation with FIG. 11A, a conventional use case of the invention is shown, according to which the formed sequence is encoded then transmitted via a telecommunication network to a receiver client appliance, that decodes and reconstructs it.

In relation with FIG. 11B, another use case of the just-described invention is shown, that of a VoD ("Video on Demand") system. The method for forming an output frame sequence from an input frame sequence as just described is then executed by a server appliance connected to a telecommunication network. The output sequence is stored in a particular header-based format, so as to associated with each sub-sequence the temporal and spatial sub-sampling rates that are applied and to make the operation reversible. It is not necessarily compressed before storage.

If it is not compressed, a DPX ("Digital Picture Exchange") or TIFF ("Tagged Image File Format") type format that forms a file per frame is used. This application of the invention exploits the advantage it provides in terms of storage resource saving.

In the DPX case, each frame header contains a field dedicated to rate information and a field dedicated to the frame size. These fields can hence be directly used to signal the format used for the current sub-sequence. In the same way, each frame being contained in an independent file, it is numbered and it is hence possible to deduce the index thereof in the sub-sequence by searching for the frame number that has undergone the last rate change.

The server appliance performs an intermediate storage of the output sequence SS formed before encoding and transmission. It can then be processed by a post-production module, then encoded and finally transmitted to one or several client appliances via a telecommunication network.

According to an alternative, an intermediate storage of the output sequence can also be performed at the end of step E22 of time sub-sampling, before step E23 of decomposition, in order to facilitate the post-production. The decomposition E23 is then performed on the pos-produced sequence.

It will be noted that the just-described invention can be implemented by means of software and/or hardware components. From this perspective, the terms "module" and "entity" used in this document can correspond either to a software component, or to a hardware component, or also to a set of hardware and/or software components, adapted to implement the function(s) described for the concerned module or entity.

In relation with FIGS. 12A and 12B, we will now describe the simplified structure of a device 100 for forming an output frame sequence, adapted to implement the forming method according to any one of the particular embodiments of the invention just described in relation with FIGS. 1 to 5.

The device 1 is adapted to form an output frame sequence SS and to insert it into an output container $C_S$.

The processing device 100 is in particular configured to:
obtain a sub-sequence of the input sequence, called current input sub-sequence $SS_E$, and a temporal frequency, called frame rate FI, associated with said sub-sequence;
process the current input sub-sequence, comprising:
temporally sub-sampling the current sub-sequence with a temporal sub-sampling rate comprised between 1 and the predetermined fraction 1/N, decreasing with the frame rate, and obtaining a second sub-sequence having a second temporal resolution $RT_2$;
spatially sub-sampling the second sub-sequence $SS_2$ with a temporal sub-sampling rate comprised between 1 and the predetermined fraction 1/N, increasing with the frame rate, so that a product of the temporal and spatial sampling rates is equal to the predetermined fraction 1/N and obtaining a third sub-sequence $SS_3$ having a third spatial resolution $RS_3$;
when the third spatial resolution $RS_3$ is higher than the output spatial resolution $RS_S$, spatially decomposing $E2_5$ the frames of the third sub-sequence $SS_3$ into at least two sub-frames of spatial resolution equal to the output spatial resolution $RS_S$ and forming $E2_6$ the output frame sub-sequence by temporally inserting sub-frames resulting from the decomposition between the decomposed frame and the following frame;
inserting INS. $SS_E$ the output sub-sequence $SS_S$ and the associated frame rate FI in an output container $C_S$.

According to a particular embodiment of the invention illustrated by FIG. 12A, the processing device 100 has the conventional architecture of a computer and comprises, in particular, a processing unit 110, equipped with a processor $\mu_1$, and piloted by a computer program $Pg_1$, 120, stored in a memory 130 and implementing the method according to the invention.

At the reset, the code instructions of the computer program $Pg_1$, 120 are for example loaded in a random access memory MEM1 before being executed by the processor of the processing unit 110. The processor of the processing unit 110 implements the steps of the above-described method, according to the instructions of the computer program 120.

According to another particular embodiment of the invention illustrated by FIG. 12B, the forming method is implemented by functional modules. For that purpose, the coding device 100 comprises at least the following functional modules:
a module OBT. $SS_E$ for obtaining a sub-sequence of the input sequence, called current input sequence $SS_E$ and a temporal frequency, called frame rate FI, associated with said sub-sequence;
a module PREP. $SS_E$ for processing the current input sub-sequence, comprising:
temporally sub-sampling the current sub-sequence with a temporal sub-sampling rate comprised between 1 and the predetermined fraction 1/N, decreasing with the frame rate, and obtaining a second sub-sequence having a second temporal resolution $RT_2$;
spatially sub-sampling the second sub-sequence $SS_2$ with a temporal sub-sampling rate comprised between 1 and the predetermined fraction 1/N, increasing with the frame rate, so that a product of the temporal and spatial sampling rates is equal to the predetermined fraction 1/N and obtaining a third sub-sequence $SS_3$ having a third spatial resolution $RS_3$;
when the third spatial resolution $RS_3$ is higher than the output spatial resolution $RS_S$, spatially decomposing $E2_5$ the frames of the third sub-sequence $SS_3$ into at least two sub-frames of spatial resolution equal to the output spatial resolution $RS_S$ and forming $E2_6$ the output frame sub-sequence by temporally inserting sub-frames resulting from the decomposition between the decomposed frame and the following frame;
a module INS. $SS_E$ for inserting the output sub-sequence $SS_S$ and the associated frame rate FI into an output container $C_S$.

The device 100 further comprises a memory M1 adapted to store the output sequence formed.

These units are piloted by the processor $\mu 1$ of the processing unit 110.

The processing unit 110 cooperates with the different functional modules described hereinabove and the memories MEM1 and M1 in order to implement the steps of the forming method according to the invention. The different functional modules described hereinabove may be in hardware and/or software form. In a software form, such a functional module can comprise a processor, a memory and program code instructions to implement the function corresponding to the module when the code instructions are executed by the processor. In hardware form, such a functional module can be implemented by any type of suitable encoding circuits, such as for example and non-limitatively, microprocessors, DSPs ("Digital Signal Processors"), ASICs ("Application Specific Integrated Circuits"), FPGA ("Field Programmable Gate Arrays") circuits, a logic unit wiring.

Advantageously, such a device 100 may be integrated to an appliance S such as a server or also a terminal appliance, such as for example a portable computer or a smartphone. The device 100 is then arranged so as to cooperate at least with the following module of the appliance S:
  a data transmission/reception module E/R, through which the data of the output sequence are transmitted via a telecommunication network, for example a wire network or a wireless network, to a receiver appliance.

In relation with FIGS. 13A and 13B, we will now describe the simplified structure of a device 200 for reconstructing an input frame sequence, adapted to implement the reconstruction method according to any one of the particular embodiments of the invention just described in relation with FIGS. 6 to 10.

The device 200 is adapted to reconstruct an input frame sequence from an output frame sequence inserted into an output container.

The processing device 200 is in particular configured for:
  obtaining, from the output container, a sub-sequence of the output sequence, and obtaining information representative of a frame rate associated with said sub-sequence, called current sub-sequence;
  processing the current sub-sequence comprising:
    when the current sub-sequence has an associated frame rate that is lower than the output temporal resolution, spatially recomposing at least two successive frames of the sub-sequence into a frame of second spatial resolution higher than the input spatial resolution and lower than or equal to the output spatial resolution so as to form a second current frame sub-sequence of second temporal resolution equal to the frame rate;
    when the second spatial resolution is lower than the output spatial resolution, spatially over-sampling the frames of the second current sub-sequence with an over-sampling rate comprised between 1 and the integer number, which increases with the frame rate, so as to obtain a third current sub-sequence of spatial resolution equal to the output spatial resolution; and
    when the second temporal resolution of the third current sub-sequence is lower than the input temporal resolution ($RT_E$), reconstructing ($R4_6$) the input current sub-sequence by temporal recopy of at least one frame of the third sub-sequence between two successive frames of the sub-sequence so as to obtain a sub-sequence ($SS_E$) having the input temporal resolution ($RT_E$).

According to a particular embodiment of the invention illustrated by FIG. 13A, the reconstruction device 200 has the conventional architecture of a computer and comprises, in particular, a processing unit 210, equipped with a processor $\mu_2$, and piloted by a computer program $Pg_2$ 220, stored in a memory 230 and implementing the method according to the invention.

At the reset, the code instructions of the computer program $Pg_2$ 220 are for example loaded in a random access memory MEM2 before being executed by the processor of the processing unit 210. The processor of the processing unit 210 implements the steps of the above-described method, according to the instructions of the computer program 220.

According to another particular embodiment of the invention illustrated by FIG. 13B, the reconstruction method is implemented by functional modules. For that purpose, the reconstruction device 200 comprises at least the following functional modules:
  a module OBT. $SS_E$ for obtaining a sub-sequence of the output sequence from an output container CS and a module OBT. FI for obtaining information representative of a frame rate associated with said sub-sequence, called current sub-sequence;
  a module POSTP. $SS_E$ for processing the current sub-sequence comprising:
    when the current sub-sequence has an associated frame rate FI that is lower than the output temporal resolution, spatially recomposing $R4_2$ at least two successive frames of the sub-sequence into a frame of second spatial resolution $RS_2$ higher than the input spatial resolution RSE and lower than or equal to the output spatial resolution $RS_S$ so as to form a second current frame sub-sequence of second temporal resolution $RT_2$ equal to the frame rate FI;
    a spatial over-sampling module for, when the second spatial resolution $RS_2$ is lower than the output spatial resolution $RS_S$, over-sampling the frames of the second current sub-sequence with a spatial over-sampling rate comprised between 1 and the integer number N, which increases with the frame rate, so as to obtain a third current sub-sequence $SS_3$ of spatial resolution equal to the output spatial resolution $RS_S$; and
    a module for reconstructing the input current sub-sequence for, when the second temporal resolution ($RT_2$) of the third current sub-sequence is lower than the input temporal resolution ($RT_E$), reconstructing ($R4_6$) the input current sub-sequence by temporal recopy of at least one frame of the third sub-sequence between two successive frames of the sub-sequence so as to obtain a sub-sequence ($SS_E$) having the input temporal resolution ($RT_E$).

The device 200 further comprises a memory M2 adapted to store the reconstructed input sequence.

These units are piloted by the processor $\mu2$ of the processing unit 210.

The processing unit 210 cooperates with the different functional modules described hereinabove and the memories MEM2 et M2 in order to implement the steps of the reconstruction method according to the invention. The different functional modules described hereinabove may be in hardware and/or software form. In a software form, such a functional module can comprise a processor, a memory and program code instructions to implement the function corresponding to the module when the code instructions are executed by the processor. In hardware form, such a functional module can be implemented by any type of suitable encoding circuits, such as for example and non-limitatively, microprocessors, DSPs ("Digital Signal Processors"), ASICs ("Application Specific Integrated Circuits"), FPGA ("Field Programmable Gate Arrays") circuits, a logic unit wiring.

Advantageously, such a device 200 may be integrated to a receiver appliance such as a client appliance CL or also a terminal appliance, such as for example a portable computer or a smartphone, or also a head mounted device HMD. The device 200 is then arranged so as to cooperate at least with the following module of the appliance CL:

- a data transmission/reception module E/R, through which the data of the output sequence are transmitted via a telecommunication network, for example a wire network or a wireless network, to a receiver appliance;
- a module for detecting the interactions of the user.

In relation with FIGS. 14A and 14B, we will now describe the simplified structure of a device 300 for the partial reconstruction of an input frame sequence, adapted to implement the reconstruction method according to any one of the particular embodiments of the invention just described in relation with FIGS. 6 to 10.

The device 300 is adapted to reconstruct an input frame sequence from an output frame sequence inserted into an output container.

The processing device 300 is in particular configured for:
- obtaining (OBT SSi), from the output container (CS), a sub-sequence of the output sequence, called current sub-sequence (SS);
- processing (EXT. I1) the current sub-sequence comprising an extraction of a first frame (10 of the sub-sequence; and
- forming (FORM $S_E'$) a partial input sequence by inserting the first frame of the current sub-sequence.

According to a particular embodiment of the invention illustrated in FIG. 14A, the partial reconstruction device 300 has the conventional architecture of a computer and comprises, in particular, a processing unit 310, equipped with a processor $\mu_3$, and piloted by a computer program $Pg_2$ 320, stored in a memory 330 and implementing the method according to the invention.

At the reset, the code instructions of the computer program $Pg_3$ 320 are for example loaded in a memory RAM MEM3 before being executed by the processor of the processing unit 310. The processor of the processing unit 310 implements the steps of the above-described method, according to the instructions of the computer program 320.

According to another particular embodiment of the invention illustrated by FIG. 14B, the reconstruction method is implemented by functional modules. For that purpose, the reconstruction device 200 comprises at least the following functional modules:

- Obtaining, from the output container (CS), a sub-sequence of the output sequence, called current sub-sequence (SS);
- Processing (EXT. I1) the current sub-sequence comprising extracting a first frame ($I_1$) from the sub-sequence; and
- Reconstructing (RECONST. $S_E'$) a partial input sequence by inserting the first frame of the current sub-sequence.

It is obvious that the embodiments described hereinabove have been given by way of purely indicative and non-limitative example, and that many modifications can be easily added by the person skilled in the art without thereby departing from the scope of the invention.

The invention claimed is:

1. A method for forming a frame sequence that is an output sequence, from an input frame sequence having an input spatial resolution and an input temporal resolution, said output sequence having an output temporal resolution equal to the input temporal resolution and an output spatial resolution equal to a predetermined fraction 1/N of the input spatial resolution by an integer number N higher than or equal to 2, the method, implemented for per sub-sequence of the input frame sequence that is a current input sub-sequence and including a predetermined number of frames, comprising, for a first sub-sequence of the input frame sequence:

obtaining a frame rate, associated with said current input sub-sequence;

processing the current input sub-sequence by:
temporally sub-sampling the current input sub-sequence with a temporal sub-sampling rate comprised between 1 and the predetermined fraction 1/N, decreasing with the obtained frame rate, and forming a second sub-sequence having a second temporal resolution, spatially sub-sampling the formed second sub-sequence with a spatial sub-sampling rate comprised between 1 and the predetermined fraction 1/N, increasing with the frame rate, so that a product of the temporal sampling rate and the spatial sampling rate is equal to the predetermined fraction 1/N, and forming a third sub-sequence having a third spatial resolution, and when the third spatial resolution is higher than the output spatial resolution, spatially decomposing frames of the third sub-sequence into at least two sub-frames and at most N sub-frames of spatial resolution equal to the output spatial resolution, and forming an output frame sub-sequence of the output sequence by temporally inserting the decomposed sub-frames between the respective decomposed frame and a following frame; and inserting the output frame sub-sequence and the associated frame rate into an output container.

2. The method for forming the output sequence according to claim 1, further comprising encoding the formed output frame sub-sequence and the associated frame rate information, wherein the inserting further comprises inserting the encoded data into the output container.

3. The method for forming the output sequence according to claim 1, further comprising determining the frame rate by:

extracting one feature vector per frame and forming one feature vector of the current input sub-sequence from N vectors, predicting a class of movement of the current input sub-sequence using the formed feature vector and a supervised automatic prediction system, and determining a frame rate associated with the predicted class of movement.

4. The method for forming the output sequence according to claim 1, further comprising determining the obtained frame rate for at least said first sub-sequence of the input sequence, said determining the obtained frame rate comprising:

extracting, for each frame of at least a part of the frames of said first sub-sequence, at least a first feature set and a second feature set, forming, for said first sub-sequence, a first feature vector from at least a part of the first feature sets extracted for the respective frames and a second feature vector from at least a part of the second feature sets extracted for the respective frames, predicting a class of movement of the first sub-sequence by at least a first classification method and a second classification method, the first method selecting or not selecting, from the first feature vector, at least a first class of movement for said first sub-sequence, the second method selecting, when said first class of movement is not selected, at least a second class of movement or a third class of movement, and obtaining the frame rate associated with the selected class of movement of the first class of movement, the second class of movement, and the third class of movement.

5. The method for forming the output sequence according to claim 1, further comprising:

obtaining information representative of an interaction of a user with the formed output frame sub-sequence; and determining whether to modify the obtained frame rate as a function of said obtained information.

6. The method for forming the output sequence according to claim 1, wherein the predetermined fraction 1/N is equal to ¼, and the spatial sub-sampling and the temporal sub-sampling comprise three distinct sub-sampling rate values.

7. A method for reconstructing a partial frame sequence having an input spatial resolution and an input temporal resolution, from the output container including the output sequence formed by the method for forming according to claim 1, having the output spatial resolution equal to 1/N times the input spatial resolution of the input frame sequence with the integer number N higher than or equal to 2, and the output temporal resolution equal to the input temporal resolution, said reconstructed partial frame sequence including a part of the frames of said input frame sequence, said output sequence being temporally cut into a plurality of sub-sequences, said method, implemented per sub-sequence, comprising:

obtaining, from the output container, a position of the current output sub-sequence;

processing the current output sub-sequence comprising extracting a first frame from the current output sub-sequence; and forming the partial frame sequence by inserting the extracted first frame of the current output sub-sequence into the partial frame sequence.

8. The method for reconstructing according to claim 7, wherein the processing comprises at least, for a sub-sequence, decoding of the first frame.

9. The method for reconstructing the partial frame sequence according to claim 7, wherein the container includes encoded data, the method further comprising decoding the encoded data of the output sequence.

10. The method for reconstructing the partial frame sequence according to claim 7, wherein the output container includes encoded data of the output frame sequence, and the method further comprises decoding the encoded data of the output frame sequence.

11. A device for reconstructing a partial frame sequence, having an input spatial resolution and an input temporal resolution from the output container including the output sequence having an output spatial resolution formed by the forming method according to claim 1, having the output spatial resolution equal to 1/N times the input spatial resolution of the input frame sequence with the integer number N higher than or equal to 2, and the output temporal resolution equal to the input temporal resolution, said reconstructed partial frame sequence including a part of the frames of said input frame sequence, said sequence being temporally cut into a plurality of sub-sequences, said device comprising:

at least one processor configured to:

obtain, from the output container, a position of the current output sub-sequence;

process the current output sub-sequence comprising an extraction of a first frame of the current output sub-sequence; and forming the partial frame sequence by inserting the extracted first frame of the current output sub-sequence into the partial frame sequence.

12. A non-transitory computer-readable medium storing a computer program including instructions for implementing the method according to claim 1, when said computer program is executed by a processor.

13. A method for reconstructing a frame sequence that is a current input sequence having an input spatial resolution and an input temporal resolution, from an output container including an output sequence having an output spatial resolution equal to 1/N times the input spatial resolution with an integer N higher than or equal to 2, and an output temporal resolution equal to the input temporal resolution, said frame sequence being temporally cut into a plurality of sub-sequences, said method, implemented for a first current sub-sequence of the output sequence that is a current output sub-sequence and including a predetermined number of frames, comprising:

obtaining the current output sub-sequence of the output sequence from the output container and obtaining information representative of a frame rate associated with said current output sub-sequence; and processing the current output sub-sequence by:

when the current output sub-sequence has the associated frame rate that is lower than the output temporal resolution, spatially recomposing at least two successive frames of the current output sub-sequence into a frame of second spatial resolution higher than the output spatial resolution and lower than or equal to the input spatial resolution to form a second current sub-sequence of second temporal resolution equal to the frame rate, when the second spatial resolution is lower than the input spatial resolution, spatially over-sampling frames of the second current sub-sequence with a spatial over-sampling rate comprised between 1 and the integer number N, which increases with the frame rate, to obtain a third current sub-sequence of spatial resolution equal to the input spatial resolution, and when the second temporal resolution of the third current sub-sequence is lower than the input temporal resolution, reconstructing a current input sub-sequence by temporal recopy of at least one frame of the third current sub-sequence between two successive frames of the third current sub-sequence to obtain a reconstructed sub-sequence of the frame sequence having the input temporal resolution.

14. The method for reconstructing the frame sequence according to claim 13, wherein the output container includes encoded data of the output frame sequence, and the method further comprises decoding the encoded data of the output frame sequence.

15. A transmitter appliance, comprising:
- a module configured to obtain an input frame sequence;
- a device configured to form the output sequence according to the method of claim 9;
- a memory configured to store the output container comprising the output sequence; and
- a transmitter configured to transmit the output container through a communication network.

16. The method for reconstructing the partial frame sequence according to claim 14, wherein the output container includes encoded data of the output frame sequence, and the method further comprises decoding the encoded data of the output frame sequence.

17. A device for forming a frame sequence that is an output sequence, from an input frame sequence having an input spatial resolution and an input temporal resolution, said output sub-sequence having an output temporal resolution equal to the input temporal resolution and an output spatial resolution equal to a predetermined fraction 1/N of the input spatial resolution by an integer number N higher than or equal to 2, the device comprising:
- at least one processor configured to, for a first sub-sequence of the input frame sequence that is a current input sub-sequence and including a predetermined number of frames:
  - obtain the current input sub-sequence and a frame rate, associated with said current input sub-sequence,
  - process the current input sub-sequence, by:
    - temporally sub-sampling the current input sub-sequence with a temporal sub-sampling rate comprised between 1 and the predetermined fraction 1/N, decreasing with the frame rate, and obtaining a second sub-sequence having a second temporal resolution,
    - spatially sub-sampling the second sub-sequence with a temporal sub-sampling rate comprised between 1 and the predetermined fraction 1/N, increasing with the frame rate, so that a product of the temporal sampling rate and the spatial sampling rate is equal to the predetermined fraction 1/N, and obtaining a third sub-sequence having a third spatial resolution, and
    - when the third spatial resolution is higher than the output spatial resolution, spatially decomposing frames of the third sub-sequence into at least two sub-frames of spatial resolution equal to the output spatial resolution, and forming an output frame sub-sequence of the output sequence by temporally inserting the decomposed at least two sub-frames between the respective decomposed frame and a following frame, and inserting the output frame sub-sequence and the associated frame rate in an output container.

18. A device for reconstructing a frame sequence that is a current input sequence, having an input spatial resolution and an input temporal resolution, from an output container including an output sequence having an output spatial resolution equal to 1/N times the input spatial resolution with an integer N higher than or equal to 2 and an output temporal resolution equal to the input temporal resolution, said frame sequence being temporally cut into a plurality of sub-sequences, said device comprising
- one or more processors configured to:
  - obtain a first current sub-sequence of the output sequence from an output container and obtain information representative of a frame rate associated with said first current sub-sequence that is a current output sub-sequence, and
  - process the current output sub-sequence by:
    - when the current output sub-sequence has the associated frame rate that is lower than the output temporal resolution, spatially recomposing at least two successive frames of the current output sub-sequence into a frame of second spatial resolution higher than the output spatial resolution and lower than or equal to the input spatial resolution to form a second current sub-sequence of second temporal resolution equal to the frame rate,
    - when the second spatial resolution is lower than the input spatial resolution, spatially over-sampling frames of the second sub-sequence with a spatial over-sampling rate comprised between 1 and the integer number N, which increases with the frame rate, to obtain a third current sub-sequence of spatial resolution equal to the input spatial resolution, and
    - when the second temporal resolution of the third current sub-sequence is lower than the input temporal resolution, reconstructing a current input sub-sequence of the current input sequence by temporal recopy of at least one frame of the third current sub-sequence between two successive frames of the third current sub-sequence to obtain a reconstructed sub-sequence of the frame sequence having the input temporal resolution.

19. A receiver appliance, comprising:
- a receiver configured to receive data through a communication network, the receiver being configured to receive the output container comprising the output frame sequence; and
- the device reconstructing an input sequence from the output sequence according to the method of claim 18.